United States Patent
Suehring et al.

(10) Patent No.: US 11,025,929 B2
(45) Date of Patent: *Jun. 1, 2021

(54) LOW DELAY CONCEPT IN MULTI-LAYERED VIDEO CODING

(71) Applicant: GE VIDEO COMPRESSION, LLC, Albany, NY (US)

(72) Inventors: Karsten Suehring, Berlin (DE); Thomas Schierl, Berlin (DE); Detlev Marpe, Berlin (DE); Robert Skupin, Berlin (DE); Yago Sanchez De La Fuente, Berlin (DE); Gerhard Tech, Berlin (DE)

(73) Assignee: GE Video Compression, LLC, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,342

(22) Filed: Aug. 27, 2019

(65) Prior Publication Data

US 2019/0387236 A1    Dec. 19, 2019

Related U.S. Application Data

(63) Continuation of application No. 14/995,430, filed on Jan. 14, 2016, now Pat. No. 10,523,954, which is a
(Continued)

(51) Int. Cl.
*H04N 19/30* (2014.01)
*H04N 19/65* (2014.01)
(Continued)

(52) U.S. Cl.
CPC ........... *H04N 19/30* (2014.11); *H04L 69/324* (2013.01); *H04N 19/119* (2014.11);
(Continued)

(58) Field of Classification Search
CPC .............................. H04N 19/70; H04N 19/44
See application file for complete search history.

(56) References Cited

U.S. PATENT DOCUMENTS

| 9,912,966 B2 | 3/2018 | Hannuksela |
| 9,930,368 B2 | 3/2018 | Schierl et al. |

(Continued)

FOREIGN PATENT DOCUMENTS

| CN | 1483289 | 3/2004 |
| CN | 1759384 A | 4/2006 |

(Continued)

OTHER PUBLICATIONS

Office Action dated Jan. 24, 2017 in Japanese Application 2016-526592.
(Continued)

*Primary Examiner* — Jerry T Jean Baptiste
(74) *Attorney, Agent, or Firm* — Morgan, Lewis & Bockius LLP

(57) ABSTRACT

An interleaved multi-layered video data stream with interleaved decoding units of different layers is provided with further timing control information in addition to the timing control information reflecting the interleaved decoding unit arrangement. The additional timing control information pertains to either a fallback position according to which all decoding units of an access unit are treated at the decoded buffer access unit-wise, or a fallback position according to which an intermediate procedure is used: the interleaving of the DUs of different layers is reversed according to the additionally sent timing control information, thereby enabling a DU-wise treatment at the decoder's buffer, however, with no interleaving of decoding units relating to different layers. Both fallback positions may be present concurrently. Various advantageous embodiments and alter-
(Continued)

natives are the subject of the various claims attached herewith.

20 Claims, 22 Drawing Sheets

Related U.S. Application Data continuation of application No. PCT/EP2014/065185, filed on Jul. 15, 2014.

(60) Provisional application No. 61/846,479, filed on Jul. 15, 2013.

(51) Int. Cl.
| | |
|---|---|
| H04N 19/70 | (2014.01) |
| H04L 29/08 | (2006.01) |
| H04N 19/187 | (2014.01) |
| H04N 19/423 | (2014.01) |
| H04N 19/44 | (2014.01) |
| H04N 19/50 | (2014.01) |
| H04N 19/85 | (2014.01) |
| H04N 19/119 | (2014.01) |
| H04N 19/166 | (2014.01) |
| H04N 19/174 | (2014.01) |
| H04N 19/593 | (2014.01) |
| H04N 19/66 | (2014.01) |
| H04N 19/89 | (2014.01) |
| H04N 19/91 | (2014.01) |
| H04N 19/33 | (2014.01) |

(52) U.S. Cl.
CPC ......... *H04N 19/166* (2014.11); *H04N 19/174* (2014.11); *H04N 19/187* (2014.11); *H04N 19/33* (2014.11); *H04N 19/423* (2014.11); *H04N 19/44* (2014.11); *H04N 19/50* (2014.11); *H04N 19/593* (2014.11); *H04N 19/65* (2014.11); *H04N 19/66* (2014.11); *H04N 19/70* (2014.11); *H04N 19/85* (2014.11); *H04N 19/89* (2014.11); *H04N 19/91* (2014.11)

(56) References Cited

U.S. PATENT DOCUMENTS

| | | | |
|---|---|---|---|
| 10,142,639 | B2 | 11/2018 | Suehring et al. |
| 10,349,065 | B2 | 4/2019 | Suehring et al. |
| 10,425,651 | B2 | 9/2019 | Suehring et al. |
| 10,484,716 | B2 | 11/2019 | Schierl et al. |
| 10,595,027 | B2 | 3/2020 | Suehring et al. |
| 10,609,399 | B2 | 3/2020 | Suehring et al. |
| 2002/0080802 | A1 | 6/2002 | Sachs et al. |
| 2005/0147053 | A1 | 7/2005 | Saito |
| 2006/0168517 | A1 | 7/2006 | Itoh et al. |
| 2007/0110150 | A1 | 5/2007 | Wang et al. |
| 2008/0036854 | A1 | 2/2008 | Elliott et al. |
| 2008/0165855 | A1 | 7/2008 | Wang et al. |
| 2009/0125636 | A1 | 5/2009 | Li et al. |
| 2009/0175353 | A1 | 7/2009 | Suh et al. |
| 2009/0225870 | A1 | 9/2009 | Narasimhan |
| 2010/0246816 | A1 | 9/2010 | Thomas et al. |
| 2012/0147140 | A1 | 6/2012 | Itakura et al. |
| 2012/0183060 | A1 | 7/2012 | Hong et al. |
| 2012/0183077 | A1 | 7/2012 | Hong |
| 2013/0028316 | A1 | 1/2013 | Leontaris et al. |
| 2013/0101035 | A1 | 4/2013 | Wang et al. |
| 2013/0176387 | A1 | 7/2013 | Suh et al. |
| 2014/0003489 | A1 | 1/2014 | Hannuksela |
| 2014/0092994 | A1* | 4/2014 | Wang ............... H04N 19/46 |
| | | | 375/240.26 |
| 2014/0301451 | A1 | 10/2014 | Deshpande |
| 2014/0301477 | A1 | 10/2014 | Deshpande |
| 2014/0334557 | A1 | 11/2014 | Schierl et al. |
| 2015/0003474 | A1 | 1/2015 | Thomas et al. |
| 2015/0023409 | A1 | 1/2015 | Schierl et al. |
| 2015/0208095 | A1 | 7/2015 | Schierl et al. |
| 2015/0271507 | A1 | 9/2015 | Hendry et al. |
| 2016/0014430 | A1 | 1/2016 | Hinz et al. |
| 2016/0057441 | A1 | 2/2016 | Skupin et al. |
| 2016/0080755 | A1* | 3/2016 | Toma ............... H04N 21/631 |
| | | | 375/240.25 |
| 2016/0134895 | A1 | 5/2016 | Suehring |
| 2016/0156936 | A1 | 6/2016 | Suehring |
| 2020/0145678 | A1 | 5/2020 | Suehring |
| 2020/0195942 | A1 | 6/2020 | Suehring et al. |

FOREIGN PATENT DOCUMENTS

| | | |
|---|---|---|
| CN | 101317460 | 12/2008 |
| CN | 101543018 | 9/2009 |
| CN | 102484561 | 5/2012 |
| CN | 102714725 | 10/2012 |
| CN | 103096078 | 5/2013 |
| EP | 2587804 A1 | 5/2013 |
| JP | 2000078197 | 3/2000 |
| JP | 2001203749 | 7/2001 |
| JP | 2010516085 | 5/2010 |
| JP | 2012010066 | 1/2012 |
| KR | 10-2010-0119002 | 11/2010 |
| KR | 10-2014-0131926 A | 11/2014 |
| KR | 1020140131926 A | 11/2014 |
| KR | 10-2015-0029723 A | 3/2015 |
| KR | 1020150029723 A | 3/2015 |
| KR | 101930817 B1 | 12/2018 |
| KR | 10-2162120 B1 | 10/2020 |
| WO | 2008085433 | 7/2008 |
| WO | 2008156548 | 10/2008 |
| WO | 2009111519 | 9/2009 |
| WO | 2011161922 | 12/2011 |
| WO | 2012/096981 A1 | 7/2012 |
| WO | 2013027407 | 2/2013 |
| WO | 2013/063094 A1 | 5/2013 |
| WO | 2013063094 A1 | 5/2013 |

OTHER PUBLICATIONS

Office Action dated Feb. 7, 2017 in Japanese Application 2016-526590.
Office Action dated Jan. 31, 2017 in Japanese Application 2016-526591.
Office Action dated Jan. 31, 2017 in European Application 14741559.0.
Priority application, U.S. Appl. No. 61/749,042, filed Jul. 15, 2013, 43 pages.
International Search Report, dated Oct. 8, 2014, from parallel International Patent Application No. PCT/EP2014/065181, 3 pages.
International Search Report, dated Aug. 22, 2014, from parallel International Patent Application No. PCT/EP2014/065182, 2 pages.
International Search Report, dated Oct. 29, 2014, from parallel International Patent Application No. PCT/EP2014/065183, 3 pages.
International Search Report, dated Oct. 23, 2014, from parallel International Patent Application No. PCT/EP2014/065184, 3 pages.
International Search Report, dated Aug. 19, 2014, from parallel International Patent Application No. PCT/EP2014/065185, 3 pages.
Bross, B., et al., "High Efficiency Video Coding (HEVC) text specification draft 10", JCTVC-L1003_v34, Geneva, CH, Jan. 14-23, 2013, 310 pages.
Tech, G., et al., "MV-HEVC Draft Text 3", JCT3V-C1004_d3, Geneva, CH, Jan. 17-23, 2013, 34 pages.
Tech, G., et al., "3D-HEVC Test Model description, draft specification", JCT3V-C1005_d0, Geneva, CH, Jan. 17-23, 2013, 142 pages.
Wilburn, B., et al., "High Performance Imaging Using Large Camera Arrays", ACM Transactions on Graphics, 2005, vol. 24, No. 3, pp. 765-776, 12 pages.

(56) References Cited

OTHER PUBLICATIONS

Wilburn, B., et al., "The Light Field Video Camera", Electronic Imaging 2002, International Society for Optics and Photonics, 2001, pp. 29-36, 8 pages.
Horimai, H., et al., "Full-Color 3D Display System with 360 Degree Horizontal Viewing Angle", Proc. Int. Symposium of 3D and Contents, 2010, pp. 7-10, 4 pages.
Suehring, K., et al., "MV-HEVC/SHVC HLS: Extending the supported number of layers", JCT3V-D0211_v1, Incheon, KR, Apr. 20-26, 2013, 7 pages.
Wang, Y.-K., et al., "Report of the joint BoG on high-level syntax", JCTVC-M0450_v5, Incheon, KR, Apr. 18-26, 2013, 33 pages.
Tech, G., et al., "3D/MV-HEVC HLS: Dependency signaling for extending the supported number of layers", JCT3V-E0223, Vienna, AT, Jul. 27-Aug. 2, 2013, 7 pages.
Hendry, H., et al., AHG 9: On dependent slice, JCTVC-K0167, Shanghai, CN, Oct. 10-19, 2012, 4 pages.
Sjoberg, R., et al., "Overview of HEVC High-Level Syntax and Reference Picture Management", IEEE Trans. Circuits Syst. Video Technol., vol. 22, No. 12, pp. 1858-1870, 13 pages.
Ruijin, F., et al., "Scalable Layered MPEG-2 Video Multicast Architecture", IEEE Trans. Consumer Electronics, vol. 47, No. 1, pp. 55-62, 8 pages.
Choi B. et al., "Layer identifier extension", Joint Collaborative Team on Video Coding (JCT-VC) of ITU-T SG16 WP3 and ISO/IEC JTC1/SC29/WG11 13th Meeting: Incheon, KR, Apr. 18-26, 2013, [JCTVC-M0164].
Deshpande S. et al., "On Sub-picture Based CPB", Joint Collaborative Team on Video Coding (JCT-VC) of ITU-T SG16 WP3 and ISO/IEC JTC1/SC29/WG11 10th Meeting: Stockholm, SE, Jul. 11-20, 2012, U.S., JCTVC, Jul. 16, 2012, JCTVC-J0306, p. 1-p. 8, URL, http://phenix.it-sudparis.eu/jct/index.php.
Suehring K et al: "3D/MV-HEVG HLS: Study and proposal of methods for extending the supported number of layers", 15. JGT-VG Meeting; Oct. 23, 2013-Nov. 1, 2013; Geneva; (Joint Collaborative Team on Video Coding of ISO/IEG JTG1/SG29/WG11 ANO ITU-T SG.16 ); URL: http://wftp3.itu.int/av-arch/jctvc-site/,,no. JCTVC-O0200, Oct. 15, 2013 (Oct. 15, 2013), XP030115242.
Office Action dated Feb. 28, 2017 in Japanese Application 2016-526588.
Office Action dated Feb. 28, 2017 in Japanese Application 2016-526589.
Office Action dated Mar. 1, 2018 in U.S. Appl. No. 14/995,222.
Notification of the First Office Action Chinese Patent Application No. 2014800506280 dated Jan. 26, 2018.
Non final Office Action U.S. Appl. No. 14/995,260 dated Mar. 28, 2018.
Non final Office Action U.S. Appl. No. 14/995,244 dated Apr. 3, 2018.
Non final Office Action U.S. Appl. No. 14/995,430 dated May 10, 2018.
Non-final Office Action U.S. Appl. No. 14/995,399 dated Jun. 11, 2018.
Notification of the First Office Action Chinese Patent Application No. 20148005066666 dated Apr. 3, 2018.
Notification of the First Office Action Chinese Patent Application No. 2014800506670 dated Apr. 3, 2018.
Notice of Allowance U.S. Appl. No. 14/995,222 dated Jul. 11, 2018.
Office Action Korean Patent Application No. 10-2016-7003788 dated Aug. 21, 2018.
K. Suehring, et al. 3D/MV-HEVC HLS: Extending the supported number of layers. JCT-VC of ITU-T and ISO/IEC. JCTVC-N0355 Ver.2, Jul. 30, 2013, pp. 1-8.
Decision to Grant a Patent Korean Patent Application No. 10-2016-7003789 dated Sep. 18, 2018.
Notice of Decision of Rejection Korean Patent Application No. 10-2016-7002764 dated Nov. 28, 2018.
Notification of the Second Office Action Chinese Patent Application No. 2014800506651 dated Dec. 12, 2018.
Non-final Office Action U.S. Appl. No. 16/157,723 dated Dec. 20, 2018.
Tiesong Zhao et al., Fast Inter-Layer Mode Decision in Scalable Video Coding, Proceedings of the 2010 IEEE 17th International Conference on Image Processing, Sep. 26-29, 2010, pp. 4221-4224.
Notice of Allowance U.S. Appl. No. 14/995,399 dated Jan. 9, 2019.
Final Office Action U.S. Appl. No. 14/995,244 dated Jan. 10, 2019.
Notice of Allowance U.S. Appl. No. 14/995,260 dated Jan. 31, 2019.
Decision to Grant a Patent dated Mar. 12, 2019 issued in corresponding Japanese Patent Application No. 2016-526591.
Li, H., et al., "Adaptive Reed-Solomon Code Protection of Data Partitioned H.264 Video", Proc. 5th IEEE Int. Conf. Intelligent Information Hiding and Multimedia Signal Processing, 2009, pp. 122-127, 6 pages.
Choi, B., et al., "Layer identifier extension for MV-HEVC and other HEVC extension", JCT3V-D0238, Incheon, KR, Apr. 20-26, 2013, 3 pages.
Suehring, K., et al., "Ultra-low delay multi-layer decoding by interleaving of decoding units in SHVC and 3D/MV-HEVC", JCTVC-M0204, Incheon, KR, Apr. 18-26, 2013, 6 pages.
Kazui, K., et al., "AHG9: Improvement of HRD for sub-picture based operation", JCTVC-J0136, Stockholm, SE, Jul. 11-20, 2012, 10 pages.
Skupin, R., et al., "Ultra-low delay with SHVC, MV-HEVC and 3DHEVC", JCT3V-E0098, Vienna, AT, Jul. 27-Aug. 2, 2013, 5 pages.
Notice of Allowance U.S. Appl. No. 16/157,723 dated Apr. 3, 2019.
Non-final Office Action U.S. Appl. No. 14/995,244 dated May 1, 2019.
NPL Internet Google Search 2019—www.google.com/search?rlv=1C1GCEA_enUS798US799&biw=1229&bih=651&tbs=cdr%3A1%2Ccd_max%3a7%2F14%2f2013&ei=z7.
T. Schierl et al., "System Layer Integration of High Efficiency Video Coding" IEEE Transactions on circuits and Systems for Video Technology, vol. 22, No. 12, Dec. 2012, pp. 1871-1884.
Kyungmo Park et al., International Organisation for Standardisation Organization Internationale De Normalisation ISO/IEC JTC1/SC29/WG11 Codin Gof Moving Pictures and Audio, Jul. 2011, Torino Italy.
Gary J. Sullivan et al., "Overview of the High Efficiency Video Coding (HEVC) Standard", IEEE Transactions on Circuits and Systems for Video Technology, vol. 22, No. 12, Dec. 2012, pp. 1649-1665.
Notice of Allowance U.S. Appl. No. 14/995,430 dated May 22, 2019.
Notice of Issuance dated Jun. 4, 2019 Chinese Patent Application No. 201480050628.0.
Third Office Action dated Jun. 25, 2019 Chinese Patent Application No. 201480050655.8.
Notification of the Third Office Action Chinese Patent Application No. 2014800506651 dated Jul. 3, 2019.
Notification of Reasons for Refusal Japanese Patent Application No. 2018-008825 dated Jul. 2, 2019.
Office Action dated Aug. 27, 2019 in Japanese Application 2016-526588.
Decision to Grant dated Oct. 11, 2019 in Korean Application 10-2018-7036575.
Decision to Grant dated Oct. 11, 2019 in Korean Application 10-2018-7031306.
Office Action dated Oct. 14, 2019 in Korean Application 10-2018-7033436.
Office Action dated Oct. 14, 2019 in Korean Application 10-2018-7031313.
Office Action dated Oct. 15, 2019 in Korean Application 10-2018-7036223.
Notice of Allowance dated Nov. 19, 2019 in Japanese Application 2018-224107.
Notice of Issuance dated Dec. 16, 2019 in Chinese Application 201480050655.8.
Notice of Allowance dated Nov. 27, 2019 in U.S. Appl. No. 16/377,449.
Office Action dated Jul. 9, 2019 in Japanese Application 2018-121752.

(56) References Cited

OTHER PUBLICATIONS

Office Action dated Jul. 9, 2019 in Japanese Application 2018-121768.
Suehring Karsten et al., "3D/MV-HEVG HLS: Extending the supported number of layers", Joint Collaborative Team on 3D Video Coding Extensions of ITU-T SG16 WP3 and ISO/IEC JTC1/SC29/W11, 5th Meeting, Vienna, AT Jul. 27-Aug. 2, 2013.
Suehring K et al: "3D/MV-HEVG HLS: Extending the supported number of layers", Joint Collaborative Team on 3D Video Coding Extensions of ITU-T SG16 WP3 and ISO/IEC JTC1/SC29/W11, 4th Meeting, Incheon, KR Apr. 20-26, 2013.
Suehring Karsten et al., "3D/MV-HEVG HLS: Dependency signaling for extending the supported number of layers", Joint Collaborative Team on 3D Video Coding Extensions of ITU-T SG16 WP3 and ISO/IEC JTC1/SC29/W11, 5th Meeting, Vienna, AT Jul. 27-Aug. 2, 2013.
Tech, Gerhard et al., "3D/MV-HEVC HLS: Flexible layer clustering for extending the supported number of layers", Joint Collaborative Team on 3D Video Coding Extensions, of ITU-T SG 16 WP 3 and ISO/IEC JTC 1/SC 29/WG 11, 5th Meeting: Vienna, AT, Jul. 27-Aug. 2, 2013.
Choi, Byeongdoo et al., "Layer identifier extension for MV-HEVC and other HEVC extension", Joint Collaborative Team on 3D Video Coding Extensions of ITU-T SG16 WP3 and ISO/IEC JTC1/SC29/W11, 4th Meeting, Incheon, KR Apr. 20-26, 2013.
Office Action dated Mar. 17, 2020 in Japanese Application 2019-075436.
Office Action dated Jan. 8, 2020 in European Patent Application 19185269.8.
Office Action dated Jan. 20, 2020 in European Patent Application 19185282.1.
Office Action dated Jan. 7, 2020 in Japanese Application 2018-233051.
Appeal Decision issued Feb. 18, 2020 in Japanese Application 2016-526589.
Office Action dated Feb. 27, 2020 in Korean Application 10-2020-7000840.
Office Action dated Feb. 28, 2020 in Korean Application 10-2020-7000920.
Office Action dated Mar. 2, 2020 in Chinese Application 201480050665.1.
Summons to Attend Oral Proceedings issued Mar. 16, 2020 in European Application 14744 010.1.
Office Action dated Feb. 18, 2020 in Japanese Application 2018-121768.
Office Action dated Feb. 18, 2020 in Japanese Application 2018-121752.
Summons to Attend Oral Proceedings issued issued Mar. 2, 2020 in European Application 14741559.0.
Notice of Allowance dated Oct. 9, 2019 in U.S. Appl. No. 14/995,244.
Kyungmo Park et al., Working Draft of MPEG Media Transport, International Organisation for Standardisation, ISO/IEC JTC1/SC29/WG11/N12169, Jul. 2011, Torino, Italy.
Office Action dated Oct. 11, 2019 in U.S. Appl. No. 16/395,761.
Notice of Allowance dated Nov. 20, 2019 in U.S. Appl. No. 16/460,230.
Office Action dated Jul. 29, 2019 in U.S. Appl. No. 16/377,449.
Office Action dated Aug. 5, 2019 in U.S. Appl. No. 16/460,230.
Office Action dated Aug. 4, 2020 in Japanese Application 2018-233051.
Decision to Grant dated Oct. 6, 2020 in Japanese Patent Application 2019-075436.
Office Action dated Oct. 22, 2020 in European Application 14744010.1.
Office Action dated Jun. 11, 2020 in U.S. Appl. No. 16/738,075.
Office Action dated Jun. 25, 2020 in U.S. Appl. No. 16/552,342.
Office Action dated Jul. 28, 2020 in U.S. Appl. No. 16/795,655.
Notice of Allowance dated Aug. 7, 2020 in U.S. Appl. No. 16/802,620.
Notice of Issuance dated Jun. 30, 2020 in Chinese Application 201480050665.1.
Decision to Grant dated Jun. 28, 2020 in Korean Application 10-2018-7036223.
Decision to Grant dated Jun. 28, 2020 in Korean Application 10-2018-7033436.
G. Tech, et al. 3D/MV-HEVC HLS: Flexible layer clustering for extending the supported number of layers. JCT-VC of ITU-T and ISO/IEC. JCTVC-N0357 Ver.1, Jul. 25, 2013, pp. 1-9.
G. Tech, et al. 3D/MV-HEVC HLS: Dependency signaling for extending the supported number of layers. JCT-VC of ITU-T and ISO/IEC. JCTVC-N0356 Ver.1, Jul. 25, 2013, pp. 1-7.
Decision to Grant dated Jun. 28, 2020 in Korean Application 10-2018-7031313.
Decision to Grant dated Jul. 14, 2020 in Japanese Application 2018-121768.
Office Action issued in corresponding Chinese Patent Application No. 201910182087.1 dated Jan. 27, 2021.
Decision to Grant a Patent issued in corresponding Korean Patent Application No. 10-2020-70000920 dated Jan. 29, 2021, with English translation.
Office Action issued in corresponding Chinese Patent Application No. 201910310534.7 dated Jan. 27, 2021.
Decision to Grant a Patent issued in corresponding Korean Patent Application No. 10-2020-7027744 dated Jan. 29, 2021, with English translation.
Robert Skupin et al. "Ultra-low delay with SHVC, MV-HEVC and 3D-HEVC", Joint Collaborative Team on Video coding (JCT-VC) of ITU-T SG 16 WP 3 and ISO/IEC JTC 1/C 29/WG 11, 14th Meeting: Vienna, AT, Jul. 25-Aug. 2, 2013.
Karsten Suehring et al., "Ultra-low delay multi-layer decoding by interleaving of decoding units in SHVC and 3D/MV-HEVC", Joint Collaborative Team on Video Coding (JCT-VC) of ITU-T SG 16 WP 3 and ISO/IEC JTC 1/C 29/WG 11, 13th Meeting: Incheon, KR, Apr. 18-26, 2013.
Kimihiko Kazui et al., "AHG9: Improvement of HRD for sub-picture based operation", Joint Collaborative Team on Video Coding (JCT-VC) of ITU-T SG 16 WP 3 and ISO/IEC JTC 1/C 29/WG 11, 10th Meeting: Stockholm, SE, Jul. 11-20, 2012.

\* cited by examiner

| | descriptor |
|---|---|
| vps_extension( ) { | |
| ... | |
| sub_pic_interleaved_hrd_params_present_flag | u(1) |
| ... | |

FIG. 11

| | descriptor |
|---|---|
| layer_decoding_unit_timing( payloadSize ) { | |
| num_layer_decoding_units_minus1 | ue(v) |
| ldu_common_cpb_interleaved_removal_delay_flag | u(1) |
| if( ldu_common_cpb_interleaved_removal_delay_flag ) | |
| ldu_common_cpb_interleaved_removal_delay_increment_minus1 | u(v) |
| num_layers | u(6) |
| for( j=0;j <= num_layers;j++ ) { | |
| for( i=0; i <= num_decoding_units_minus1; i++ ) { | |
| num_nalus_in_ldu_minus1[ j ][ i ] | ue(v) |
| if( !ldu_common_cpb_interleaved_removal_delay_flag && i < num_lyer_decoding_units_minus1 ) | |
| ldu_cpb_interleaved_removal_delay_increment_minus1[ j ][ i ] | u(v) |
| } | |
| } | |

FIG. 12A

| layer_decoding_unit_info( payloadSize ) { | descriptor |
|---|---|
| layer_decoding_unit_idx | ue(v) |
| ldu_spt_interleaved_present | u(1) |
| if( ldu_spt_interleaved_present ) | |
|   ldu_spt_cpb_removal_delay_interleaved_increment | u(v) |
| } | |

FIG 12B

| decoding_unit_info( payloadSize ) { | descriptor |
|---|---|
| decoding_unit_idx | ue(v) |
| if( !sub_pic_cpb_params_in_pic_timing_sei_flag ) | |
|   du_spt_cpb_removal_delay_increment | u(v) |
| dpb_output_du_delay_present_flag | u(1) |
| if( dpb_output_du_delay_present_flag ) | |
|   pic_spt_dpb_output_du_delay | u(v) |
| } | |

FIG 12C

LOW DELAY CONCEPT IN MULTI-LAYERED VIDEO CODING

CROSS-REFERENCE TO RELATED APPLICATIONS

This is a continuation of U.S. Ser. No. 14/995,430, filed Jan. 14, 2016, which is a Continuation of International Application No. PCT/EP2014/065185, filed Jul. 15, 2014, which claims priority from U.S. Provisional Patent Application No. 61/846,479, filed Jul. 15, 2013. The subject matter of each of the foregoing patent applications is incorporated herein by reference in its entirety.

BACKGROUND OF THE INVENTION

The present application is concerned with coding concepts allowing efficient multi-view/layer coding such as multi-view picture/video coding.

In Scalable Video Coding (SVC) the coded picture buffer (CPB) operates on complete access units (AUs). All Network Abstraction Layer Units (NALUs) of one AU are removed from the Coded Picture Buffer (CPB) at the same time instant. An AU contains the packets (i.e. NALUs) of all layers.

In the HEVC base specification [1] the concept of decoding units (DU) is added compared to H.264/AVC. A DU is a group of NAL units at consecutive positions in the bitstream. In a single layer video bitstream all these NAL units belong to the same layer, i.e. that so called base layer.

The HEVC base specification contains the tools needed to allow decoding of bitstreams with ultra-low delay, i.e. through CPB operation on DU level and CPB timing information with DU granularity as opposed to CPB operation on AU level as in H.264/AVC. Thus, a device can operate on sub-portions of pictures in order to reduce occurring processing delays.

For similar ultra-low delay operations in the multi-layer SHVC, MV-HEVC and 3D-HEVC extensions of HEVC, CPB operations on DU level across layers need to be defined accordingly. Particularly, a bitstream in which the DUs of an AU with several layers or views are interleaved across layers is necessitated, i.e. DUs of layer m of a given AU may follow DUs of layer (m+1) of the same AU in such an ultra-low delay enabled multi-layer bitstream as long as there are no dependencies on the DUs following in bitstream order.

The ultra-low delay operation necessitates modifications of the CPB operation for a multi-layer decoder compared to the SVC and MVC extension of H.264/AVC that work based on AUs. An ultra-low delay decoder can make use of additional timing information, e.g. provided through SEI messages.

Some implementations of a multi-layer decoder may advantageously use a layer-wise decoding (and CPB operation either on DU or AU level), i.e. decoding of layer m prior to decoding of layer m+1, which would effectively prohibit any multi-layer ultra-low delay applications with SHVC, MV-HEVC and 3D-HEVC, unless new mechanisms are provided.

Currently, the HEVC base spec contains two decoding operation modes:
 access unit (AU) based decoding: all decoding units of an access unit are removed from the CPB at the same time
 decoding unit (DU) based decoding: each decoding unit has an own CPB removal time Nevertheless, it would be more favorable to have concepts at hand which further improve multi-view/layer coding concepts.

Accordingly, it is the object of the present invention to provide concepts which further improve multi-view/layer coding concepts. In particular, it is the object of the present invention to provide a possibility to enable low end-to-end delay without, however, giving up at least one fallback position for decoders not able to deal with, or deciding not to use, the low delay concept.

SUMMARY

An embodiment may have a multi-layered video data stream having, for each of a plurality of layers, video content encoded therein in units of sub-portions of pictures of the video content using inter-layer prediction, each sub-portion being respectively encoded into one or more payload packets of a sequence of packets of the video data stream, each packet being associated with one of the plurality of layers, the sequence of packets being divided into a sequence of access units so that each access unit collects the payload packets relating to a common time instant, wherein the access units are subdivided into decoding units so that each access unit is subdivided into two or more decoding units, with each decoding unit solely having payload packets associated with one of the plurality of layers, and the decoding units having payload packets associated with different layers are interleaved with each other, each access unit having a first timing control information signaling a first decoder buffer retrieval time for the respective access unit, and a second timing control information signaling, for each decoding unit of the access unit, a second decoder buffer retrieval time corresponding to their decoding unit's sequential order in the multi-layer video data stream.

Another embodiment may have a multi-layered video data stream having, for each of a plurality of layers, video content encoded therein in units of sub-portions of pictures of the video content using inter-layer prediction, each sub-portion being respectively encoded into one or more payload packets of a sequence of packets of the video data stream, each packet being associated with one of the plurality of layers, the sequence of packets being divided into a sequence of access units so that each access unit collects the payload packets relating to a common time instant, wherein the access units are subdivided into decoding units so that each access unit is subdivided into two or more decoding units, with each decoding unit solely having payload packets associated with one of the plurality of layers, and the decoding units having payload packets associated with different layers are interleaved with each other, each access unit having a first timing control information signaling, for each decoding unit of the respective access unit, a first decoder buffer retrieval time so that, in accordance with the first decoder buffer retrieval time for the respective access unit's decoding units, the decoding units in the respective access unit are ordered in accordance with a layer order defined among the plurality of layers so that no decoding unit having packets associated with a first layer follows any decoding unit in the respective access unit, having packets associated with a second layer succeeding the first layer in accordance with the layer order, and a second timing control information signaling, for each decoding unit of the access unit, a second decoder buffer retrieval time corresponding to the decoding unit's sequential order in the multi-layer video data stream.

Another embodiment may have an encoder for encoding video content into a multi-layered video data stream so that same has, for each of a plurality of layers, the video content encoded therein in units of sub-portions of pictures of the video content using inter-layer prediction, each sub-portion being respectively encoded into one or more payload packets of a sequence of packets of the video data stream, each packet being associated with one of the plurality of layers, the sequence of packets being divided into a sequence of access units so that each access unit collects the payload packets relating to a common time instant, wherein the access units are subdivided into decoding units so that each access unit is subdivided into two or more decoding units, with each decoding unit solely having payload packets associated with one of the plurality of layers, wherein the decoding units having payload packets associated with different layers are interleaved with each other, each access unit having a first timing control information signaling a decoder buffer retrieval time for the respective access unit, and a second timing control information signaling, for each decoding unit of the access unit, a decoder buffer retrieval time corresponding to their sequential order in the multi-layer video data stream.

Another embodiment may have an encoder for encoding video content into a multi-layered video data stream so that same has, for each of a plurality of layers, video content encoded therein in units of sub-portions of pictures of the video content using inter-layer prediction, each sub-portion being respectively encoded into one or more payload packets of a sequence of packets of the video data stream, each packet being associated with one of the plurality of layers, the sequence of packets being divided into a sequence of access units so that each access unit collects the payload packets relating to a common time instant, wherein the access units are subdivided into decoding units so that each access unit is subdivided into two or more decoding units, with each decoding unit solely having payload packets associated with one of the plurality of layers, and the decoding units having payload packets associated with different layers are interleaved with each other, each access unit having a first timing control information signaling, for each decoding unit of the respective access unit, a first decoder buffer retrieval time so that, in accordance with the first decoder buffer retrieval time for the respective access unit's decoding units, the decoding units in the respective access unit are ordered in accordance with a layer order defined among the plurality of layers so that no decoding unit having packets associated with a first layer follows any decoding unit in the respective access unit, having packets associated with a second layer succeeding the first layer in accordance with the layer order, and a second timing control information signaling, for each decoding unit of the access unit, a second decoder buffer retrieval time corresponding to the decoding unit's sequential order in the multi-layer video data stream.

Still another embodiment may have a decoder configured to decode a multi-layered video data stream as mentioned above configured to empty the decoder's buffer for buffering the multi-layered data stream in units of access units using the first timing control information and irrespective of the second timing control information.

Another embodiment may have a decoder configured to decode a multi-layered video data stream as mentioned above configured to empty the decoder's buffer for buffering the multi-layered data stream in units of access units using the first timing control information and irrespective of the second and third timing control information.

Another embodiment may have a decoder configured to decode a multi-layered video data stream having, for each of a plurality of layers, video content encoded therein in units of sub-portions of pictures of the video content using inter-layer prediction, each sub-portion being respectively encoded into one or more payload packets of a sequence of packets of the video data stream, each packet being associated with one of the plurality of layers, the sequence of packets being divided into a sequence of access units so that each access unit collects the payload packets relating to a common time instant, wherein the access units are subdivided into decoding units so that each access unit is subdivided into two or more decoding units, with each decoding unit solely having payload packets associated with one of the plurality of layers, and the decoding units having payload packets associated with different layers are interleaved with each other, each access unit having a first timing control information signaling a first decoder buffer retrieval time for the respective access unit, and a second timing control information signaling, for each decoding unit of the access unit, depending on a decoding unit interleaving flag, a second decoder buffer retrieval time corresponding to the decoding unit's sequential order in the multi-layer video data stream, or a third decoder buffer retrieval time so that, in accordance with the third decoder buffer retrieval time for the respective access unit's decoding units, the decoding units in the respective access unit are ordered in accordance with a layer order defined among the plurality of layers so that no decoding unit having packets associated with a first layer follows any decoding unit in the respective access unit, having packets associated with a second layer succeeding the first layer in accordance with the layer order, wherein the decoder is configured to be responsive to the decoding unit interleaving flag, if the second timing control information signals the second decoder buffer retrieval time for each decoding unit, empty the decoder's buffer for buffering the multi-layered data stream in units of access units using the first timing control information and irrespective of the second and third timing control information, or if the second timing control information signals the third decoder buffer retrieval time for each decoding unit, empty the decoder's buffer for buffering the multi-layered data stream in units of the decoding units using the third timing control information.

Another embodiment may have a decoder configured to decode a multi-layered video data stream as mentioned above configured to empty the decoder's buffer for buffering the multi-layered data stream in units of the decoding units using the second timing control information.

Another embodiment may have a decoder configured to decode a multi-layered video data stream as mentioned above configured to empty the decoder's buffer for buffering the multi-layered data stream in units of the decoding units using the first timing control information and irrespective of the second timing control information.

Another embodiment may have a decoder configured to decode a multi-layered video data stream as mentioned above configured to empty the decoder's buffer for buffering the multi-layered data stream in units of the decoding units using the second timing control information and irrespective of the first timing control information.

Another embodiment may have an intermediate network device configured to forward a multi-layered video data stream as mentioned above to the coded picture buffer of a decoder, configured to receive an information qualifying the decoder as being able to handle the second timing control information, if the decoder is able to handle the second timing control information, derive earliest-arrival or removal times for scheduling the forwarding, from the first and second timing control information in accordance with a first computation rule; and if the decoder is not able to handle the second timing control information, derive earliest-arrival or removal times for scheduling the forwarding, from the first and second timing control information in accordance with a second computation rule.

Another embodiment may have a method for encoding video content into a multi-layered video data stream so that same has, for each of a plurality of layers, the video content encoded therein in units of sub-portions of pictures of the video content using inter-layer prediction, each sub-portion being respectively encoded into one or more payload packets of a sequence of packets of the video data stream, each packet being associated with one of the plurality of layers, the sequence of packets being divided into a sequence of access units so that each access unit collects the payload packets relating to a common time instant, wherein the access units are subdivided into decoding units so that each access unit is subdivided into two or more decoding units, with each decoding unit solely having payload packets associated with one of the plurality of layers, wherein the decoding units having payload packets associated with different layers are interleaved with each other, each access unit having a first timing control information signaling a decoder buffer retrieval time for the respective access unit, and a second timing control information signaling, for each decoding unit of the access unit, a decoder buffer retrieval time corresponding to their sequential order in the multi-layer video data stream.

Another embodiment may have a method for encoding video content into a multi-layered video data stream so that same has, for each of a plurality of layers, video content encoded therein in units of sub-portions of pictures of the video content using inter-layer prediction, each sub-portion being respectively encoded into one or more payload packets of a sequence of packets of the video data stream, each packet being associated with one of the plurality of layers, the sequence of packets being divided into a sequence of access units so that each access unit collects the payload packets relating to a common time instant, wherein the access units are subdivided into decoding units so that each access unit is subdivided into two or more decoding units, with each decoding unit solely having payload packets associated with one of the plurality of layers, and the decoding units having payload packets associated with different layers are interleaved with each other, each access unit having a first timing control information signaling, for each decoding unit of the respective access unit, a first decoder buffer retrieval time so that, in accordance with the first decoder buffer retrieval time for the respective access unit's decoding units, the decoding units in the respective access unit are ordered in accordance with a layer order defined among the plurality of layers so that no decoding unit having packets associated with a first layer follows any decoding unit in the respective access unit, having packets associated with a second layer succeeding the first layer in accordance with the layer order, and a second timing control information signaling, for each decoding unit of the access unit, a second decoder buffer retrieval time corresponding to the decoding unit's sequential order in the multi-layer video data stream.

Still another embodiment may have a method for decoding a multi-layered video data stream as mentioned above having emptying the decoder's buffer for buffering the multi-layered data stream in units of access units using the first timing control information and irrespective of the second timing control information.

Another embodiment may have a method for decoding a multi-layered video data stream as mentioned above configured to empty the decoder's buffer for buffering the multi-layered data stream in units of access units using the first timing control information and irrespective of the second and third timing control information.

Another embodiment may have a method for decoding a multi-layered video data stream having, for each of a plurality of layers, video content encoded therein in units of sub-portions of pictures of the video content using inter-layer prediction, each sub-portion being respectively encoded into one or more payload packets of a sequence of packets of the video data stream, each packet being associated with one of the plurality of layers, the sequence of packets being divided into a sequence of access units so that each access unit collects the payload packets relating to a common time instant, wherein the access units are subdivided into decoding units so that each access unit is subdivided into two or more decoding units, with each decoding unit solely having payload packets associated with one of the plurality of layers, and the decoding units having payload packets associated with different layers are interleaved with each other, each access unit having a first timing control information signaling a first decoder buffer retrieval time for the respective access unit, and a second timing control information signaling, for each decoding unit of the access unit, depending on a decoding unit interleaving flag, a second decoder buffer retrieval time corresponding to the decoding unit's sequential order in the multi-layer video data stream, or a third decoder buffer retrieval time so that, in accordance with the third decoder buffer retrieval time for the respective access unit's decoding units, the decoding units in the respective access unit are ordered in accordance with a layer order defined among the plurality of layers so that no decoding unit having packets associated with a first layer follows any decoding unit in the respective access unit, having packets associated with a second layer succeeding the first layer in accordance with the layer order, wherein the method has responding to the decoding unit interleaving flag, so as to if the second timing control information signals the second decoder buffer retrieval time for each decoding unit, emptying the decoder's buffer for buffering the multi-layered data stream in units of access units using the first timing control information and irrespective of the second and third timing control information, or if the second timing control information signals the third decoder buffer retrieval time for each decoding unit, emptying the decoder's buffer for buffering the multi-layered data stream in units of the decoding units using the third timing control information.

Another embodiment may have a method for decoding a multi-layered video data stream as mentioned above having emptying the decoder's buffer for buffering the multi-layered data stream in units of the decoding units using the second timing control information.

Another embodiment may have a method for decoding a multi-layered video data stream as mentioned above having emptying the decoder's buffer for buffering the multi-layered data stream in units of the decoding units using the first timing control information and irrespective of the second timing control information.

Another embodiment may have a method for decoding a multi-layered video data stream as mentioned above having emptying the decoder's buffer for buffering the multi-layered data stream in units of the decoding units using the second timing control information and irrespective of the first timing control information.

According to another embodiment, a method for forwarding a multi-layered video data streams as mentioned above to the coded picture buffer of a decoder may have the steps of: receiving an information qualifying the decoder as being able to handle the second timing control information, if the decoder is able to handle the second timing control information, deriving earliest-arrival or removal times for scheduling the forwarding, from the first and second timing control information in accordance with a first computation rule; and if the decoder is not able to handle the second timing control information, deriving earliest-arrival or removal times for scheduling the forwarding, from the first and second timing control information in accordance with a second computation rule.

Another embodiment may have a computer program having a program code for performing, when running on a computer, any of the methods as mentioned above.

The idea underlying the present application is to provide an interleaved multi-layered video data stream with interleaved decoding units of different layers with further timing control information in addition to the timing control information reflecting the interleaved decoding unit arrangement. The additional timing control information pertains to either a fallback position according to which all decoding units of an access unit are treated at the decoded buffer access unit-wise, or a fallback position according to which an intermediate procedure is used: the interleaving of the DUs of different layers is reversed according to the additionally sent timing control information, thereby enabling a DU-wise treatment at the decoder's buffer, however, with no interleaving of decoding units relating to different layers. Both fallback positions may be present concurrently. Various advantageous embodiments and alternatives are the subject of the various claims attached herewith.

BRIEF DESCRIPTION OF THE DRAWINGS

Embodiments of the present application are described below with respect to the figures, among which:

FIG. 11 shows a syntax example of a portion of a VPS syntax extension including a flag indicating interleaved transmission of DUs of varying layers;

FIG. 12a shows an exemplary syntax of an SEI message including timing control information enabling DU deinterleaved removal of interleaved transmitted DUs from the decoder's buffer in accordance with an embodiment;

FIG. 12b shows an exemplary syntax of an SEI message supposed to be interspersed at the beginnings of interleaved DUs, also conveying the timing control information of FIG. 12a, in accordance with an alternative embodiment;

FIG. 12c shows an exemplary syntax of an SEI message revealing timing control information enabling DU-wise buffer retrieval while maintaining the DU interleaving in accordance with an embodiment;

DETAILED DESCRIPTION OF THE INVENTION

First, as an overview, an example for an encoder/decoder structure is presented which fits to the subsequently presented embodiments. That is, the encoder may be embodied so as to take advantage of the subsequently outlined concept, and the same applies with respect to the decoder.

Figure 1:
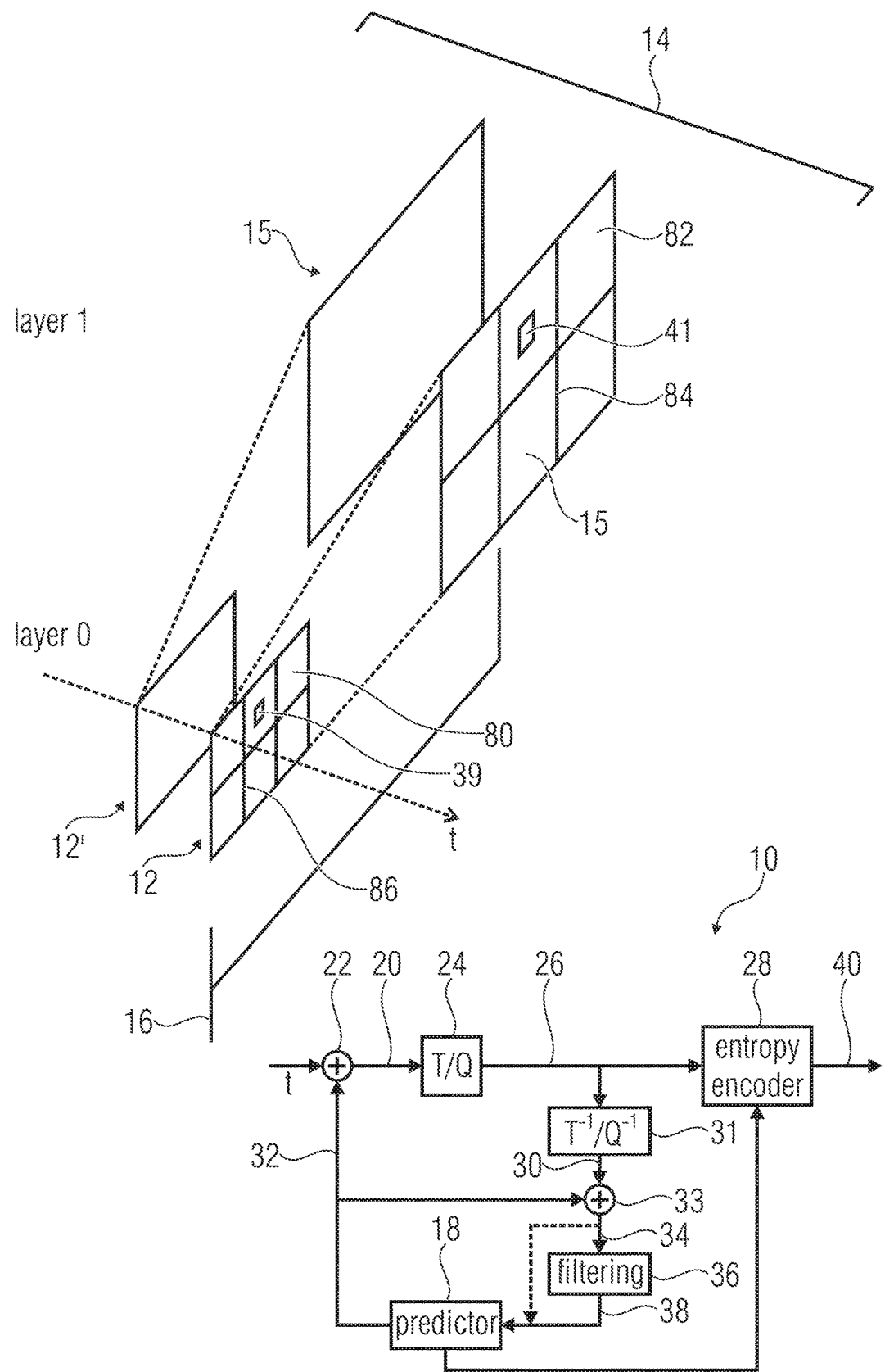
FIG. 1 shows a video encoder serving as an illustrative example for implementing any of the multi-layer encoders further outlined with respect to the following figures.

FIG. 1 shows a general structure of an encoder in accordance with an embodiment. The encoder 10 could be implemented to be able to operate in a multi-threaded way or not, i.e., merely single-threaded. That is, encoder 10 could, for example, be implemented using multiple CPU cores. In other words, the encoder 10 could support parallel processing but it does not have to. The bitstreams generated will also be generatable/decodable by single-threaded encoders/decoders. The coding concept of the present application enables, however, parallel processing encoders to efficiently apply parallel processing without, however, compromising the compression efficiency. With regard to the parallel processing ability, similar statements are valid for the decoder which is described later with respect to FIG. 2.

The encoder 10 is a video encoder. A picture 12 of a video 14 is shown as entering encoder 10 at an input 16. Picture 12 shows a certain scene, i.e., picture content. However, encoder 10 receives at its input 16 also another picture 15 pertaining the same time instant with both pictures 12 and 15 belonging to different layers. Merely for illustration purposes, picture 12 is shown as belonging to layer zero whereas picture 15 is shown as belonging to layer 1. FIG. 1 illustrates that layer 1 may involve, with respect to layer zero, a higher spatial resolution, i.e., may show the same scene with a higher number of picture samples but this is merely for illustration purposes only and picture 15 of layer 1 may, alternatively, have the same spatial resolution but may differ, for example, in the view direction relative to layer zero, i.e., pictures 12 and 15 may have been captured from different viewpoints. It is noted that the terminology of base and enhancement layer used in this document may refer to any set of reference and depending layer in the hierarchy of layers.

The encoder 10 is a hybrid encoder, i.e., pictures 12 and 15 are predicted by a predictor 18 of encoder 10 and the prediction residual 20 obtained by a residual determiner 22 of encoder 10 is subject to a transform, such as a spectral decomposition such as a DCT, and a quantization in a transform/quantization module 24 of encoder 10. The transformed and quantized prediction residual 26, thus obtained, is subject to entropy coding in an entropy coder 28, such as arithmetic coding or variable length coding using, for example, context-adaptivity. The reconstructible version of the residual is available for the decoder, i.e., the dequantized and retransformed residual signal 30 is recovered by a retransform/requantizing module 31 and recombined with a prediction signal 32 of predictor 18 by a combiner 33, thereby resulting in a reconstruction 34 of picture 12 and 15 respectively. However, encoder 10 operates on a block basis. Accordingly, reconstructed signal 34 suffers from discontinuities at block boundaries and, accordingly, a filter 36 may be applied to the reconstructed signal 34 in order to yield a reference picture 38 for pictures 12 and 15, respectively, on the basis of which predictor 18 predicts subsequently encoded pictures of the different layers. As shown by a dashed line in FIG. 1, predictor 18 may, however, also, such as in other prediction modes such as spatial prediction modes, exploit the reconstructed signal 34 directly without filter 36 or an intermediate version.

The predictor 18 may choose among different prediction modes in order to predict certain blocks of picture 12. One such block 39 of picture 12 is exemplarily shown in FIG. 1. There may be a temporal prediction mode according to which block 39 which is representative for any block of picture 12 into which picture 12 is partitioned, is predicted on the basis of a previously coded picture of the same layer such as picture 12'. A spatial prediction mode may also exist according to which a block 39 is predicted on the basis of a previously coded portion of the same picture 12, neighboring block 39. A block 41 of picture 15 is also illustratively shown in FIG. 1 so as to be representative for any of the other blocks into which picture 15 is partitioned. For block 41, predictor 18 may support the prediction modes just-discussed, i.e. temporal and spatial prediction modes. Additionally, predictor 18 may provide for an inter-layer prediction mode according to which block 41 is predicted on the basis of a corresponding portion of picture 12 of a lower layer. "Corresponding" in "corresponding portion" shall denote the spatial correspondence, i.e., a portion within picture 12 showing the same portion of the scene as bock 41 to be predicted in picture 15.

The predictions of predictor 18 may, naturally, not be restricted to picture samples. The prediction may apply to any coding parameter, too, i.e. prediction modes, motion vectors of the temporal prediction, disparity vectors of the multi-view prediction, etc. Merely the residuals may then be coded in bitstream 40. That is using spatial and/or inter-layer prediction, coding parameters could be predictively coded/decoded. Even here, disparity compensation could be used.

A certain syntax is used in order to compile the quantized residual data 26, i.e., transform coefficient levels and other residual data, as well as the coding parameters including, for example, prediction modes and prediction parameters for the individual blocks 39 and 41 of pictures 12 and 15 as determined by predictor 18 and the syntax elements of this syntax are subject to entropy coding by entropy coder 28. The thus obtained data stream 40 as output by entropy coder 28 forms the bitstream 40 output by encoder 10.

Figure 2:
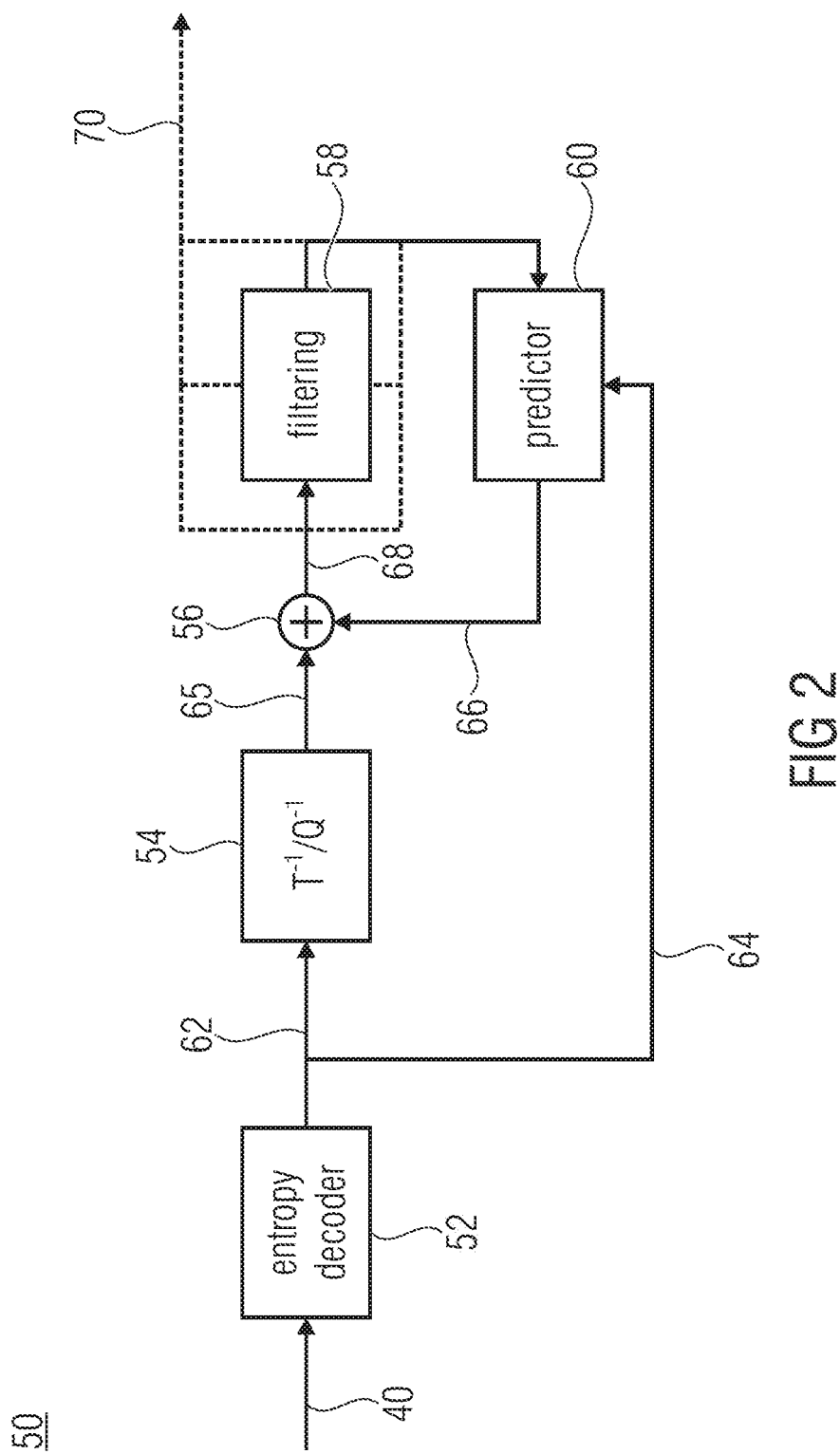
FIG. 2 shows a schematic block diagram showing a video decoder fitting to the video encoder of FIG. 1.

FIG. 2 shows a decoder which fits to the encoder FIG. 1, i.e., is able to decode the bitstream 40. The decoder of FIG. 2 is generally indicated by reference sign 50 and comprises an entropy decoder, a retransform/dequantizing module 54, a combiner 56, a filter 58 and a predictor 60. The entropy decoder 42 receives the bitstream and performs entropy decoding in order to recover the residual data 62 and the coding parameters 64. The retransform/dequantizing module 54 dequantizes and retransforms the residual data 62 and forwards the residual signal thus obtained to combiner 56. Combiner 56 also receives a prediction signal 66 from predictor 60 which, in turn, forms the prediction signal 66 using the coding parameter 64 on the basis of the reconstructed signal 68 determined by combiner 56 by combining the prediction signal 66 and the residual signal 65. The prediction mirrors the prediction finally chosen be predictor 18, i.e. the same prediction modes are available and these modes are selected for the individual blocks of pictures 12 and 15 and steered according to the prediction parameters. As already explained above with respect to FIG. 1, the predictor 60 may use the filtered version of the reconstructed signal 68 or some intermediate version thereof, alternatively or additionally. The pictures of the different layers to be finally reproduced and output at output 70 of decoder 50 may likewise be determined on an unfiltered version of the combination signal 68 or some filtered version thereof.

Figure 10:
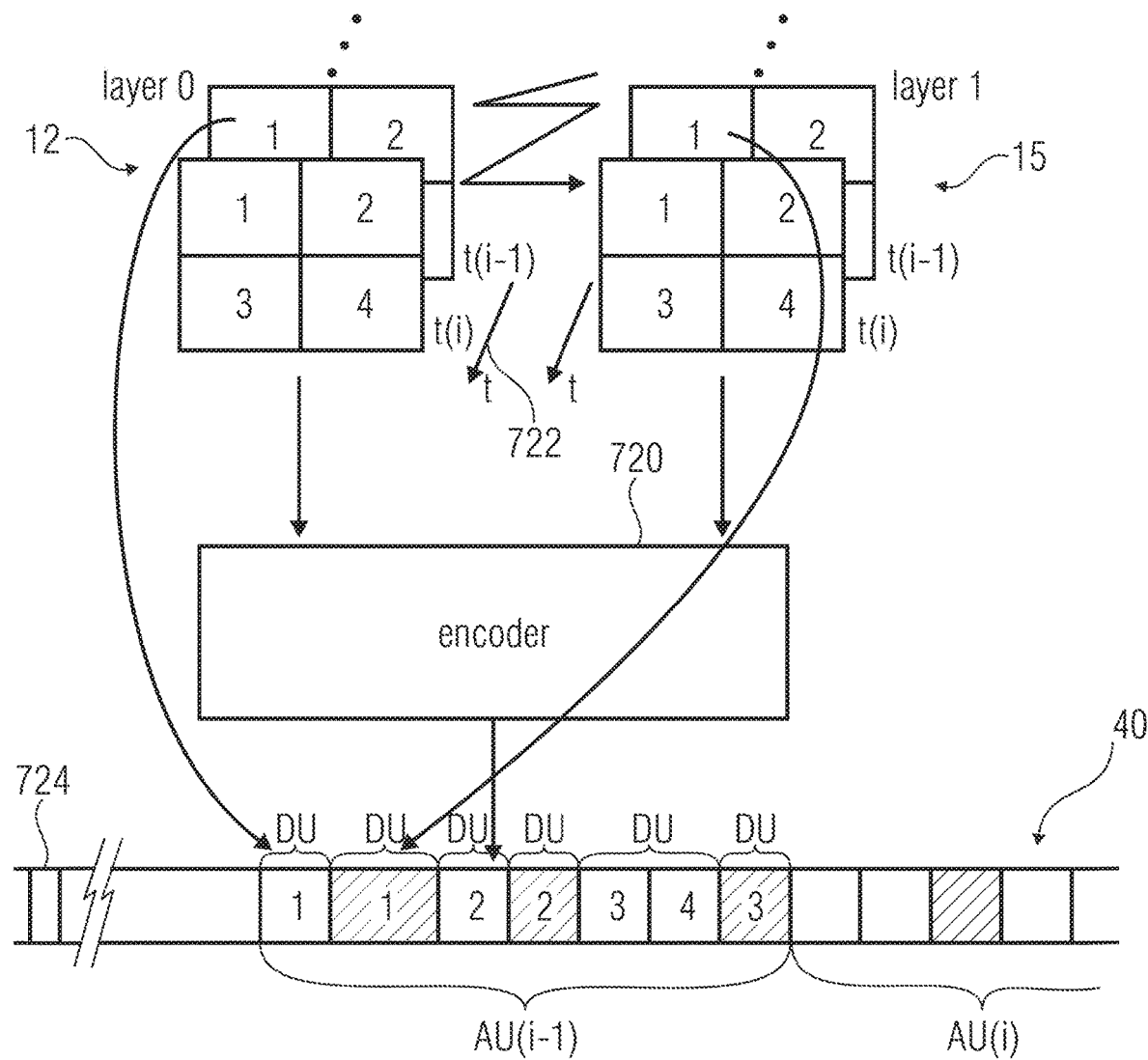
FIG. 10 shows a schematic block diagram of an encoder fitting to the decoder of FIG. 9.

Encoder 10 of FIG. 10 supports the tile concept. In accordance with the tile concept, the pictures 12 and 15 are subdivided into tiles 80 and 82, respectively, and at least the predictions of blocks 39 and 41 within these tiles 80 and 82, respectively, are restricted to use, as a basis for spatial prediction, merely data relating to the same tile of the same picture 12, 15, respectively. This means, the spatial prediction of block 39 is restricted to use previously coded portions of the same tile, but the temporal prediction mode is unrestricted to rely on information of a previously coded picture such as picture 12'. Similarly, the spatial prediction mode of block 41 is restricted to use previously coded data of the same tile only, but the temporal and inter-layer prediction modes are unrestricted. The predictor 60 of decoder 50 is likewise configured to treat tile boundaries specifically: predictions and entropy context selection and/or adaptation are performed within one tile only without crossing any tile boundary.

The subdivision of pictures 15 and 12 into six tiles, respectively, has merely been chosen for illustration purposes. The subdivision into tiles may be selected and signaled within bitstream 40 individually for pictures 12', 12 and 15, 15', respectively. The number of tiles per picture 12 and 15, respectively, may be any of one, two, three, four, six and so forth, wherein tile partitioning may be restricted to regular partitioning into rows and columns of tiles only. For the sake of completeness, it is noted that the way of coding the tiles separately may not be restricted to the intra-prediction or spatial prediction but may also encompass any prediction of coding parameters across tile boundaries and the context selection in the entropy coding. That is that latter may also be restricted to be dependent only on data of the same tile. Thus, the decoder is able to perform the just-mentioned operations in parallel, namely in units of tiles.

Figure 3:
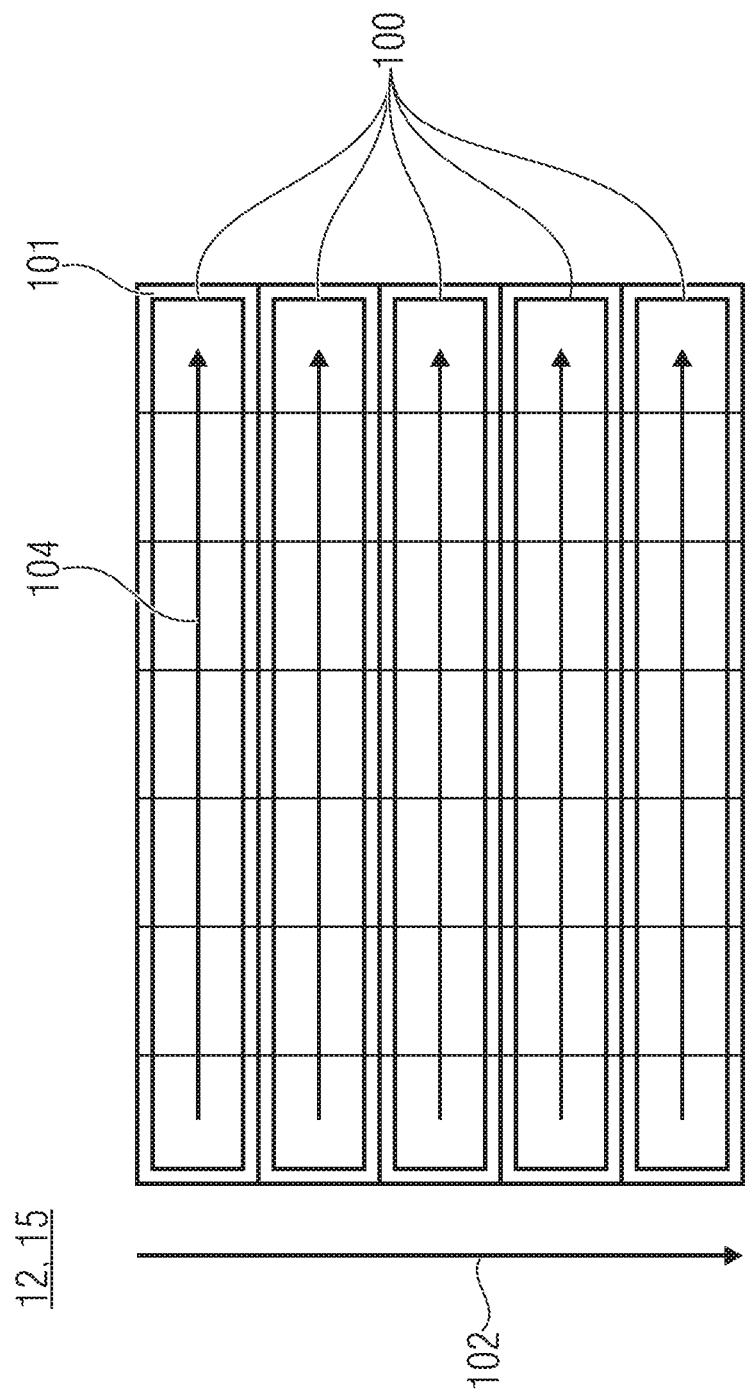
FIG. 3 shows a schematic diagram of a picture subdivided into substreams for WPP processing.

The encoder and decoders of FIGS. 1 and 2 could alternatively or additionally be able to use/support WPP (wavefront parallel processing) concept. See FIG. 3. WPP substreams 100 also represent a spatial partitioning of a picture 12, 15 into WPP substreams. In contrast to tiles and slices, WPP substreams do not impose restrictions onto predictions and context selections across WPP substreams 100. WPP substreams 100 extend row-wise such as across rows of LCUs (Largest Coding Unit) 101, i.e. the greatest possible blocks for which prediction coding modes are individually transmittable in the bitstream, and in order to enable parallel processing, merely one compromise is made in relation to entropy coding. In particular, an order 102 is defined among the WPP substreams 100, which exemplarily leads from top to bottom, and for each WPP substream 100, except for the first WPP substream in order 102, the probability estimates for the symbol alphabet, i.e. the entropy probabilities, are not completely reset but adopted from or set to be equal to the probabilities resulting after having entropy coded/decoded the immediately preceding WPP substream up to the second LCU, thereof, as indicated by lines 104, with the LCU order, or the substreams' decoder order, starting, for each WPP substream at the same side of the picture 12 and 15, respectively, such as the left-hand side as indicated by arrow 106 and leading, in LCU row direction, to the other side. Accordingly, by obeying some coding delay between the sequence of WPP substreams of the same picture 12 and 15, respectively, these WPP substreams 100 are decodable/codable in parallel, so that the portions at which the respective picture 12, 15 is coded/decoded in parallel, i.e. concurrently, forms a kind of wavefront 108 which moves across the picture in a tilted manner from left to right.

It is briefly noted that orders 102 and 104 also define a raster scan order among the LCUs leading from the top left LCU 101 to the bottom right LCU row by row from top to bottom. WPP substreams may correspond to one LCU row each. Briefly referring back to tiles, the latter may also restricted to be aligned to LCU borders. Substreams may be fragmented into one or more slices without being bound to LCU borders as far as the borders between two slices in the inner of a substream is concerned. The entropy probabilities are, however, adopted in that case when transitioning from one slice of a substream to the next of the substream. In case of tiles, whole tiles may be summarized into one slice or one tile may be fragmented into one or more slices with again not being bound to LCU borders as far as the borders between two slices in the inner of a tile is concerned. In case of tiles, the order among the LCUs is changed so as to traverse the tiles in tile order in raster scan order first before proceeding to the next tile in tile order.

As described until now, picture 12 may be partitioned into tiles or WPP substreams, and likewise, picture 15 may be partitioned into tiles or WPP substreams, too. Theoretically, WPP substream partitioning/concept may be chosen for one of pictures 12 and 15 while tile partitioning/concept is chosen for the other of the two. Alternatively, a restriction could be imposed onto the bitstream according to which the concept type, i.e. tiles or WPP substreams, has to be the same among the layers.

Another example for a spatial segment encompasses slices. Slices are used to segment the bitstream 40 for transmission purposes. Slices are packed into NAL units which are the smallest entities for transmission. Each slice is independently codable/decodable. That is, any prediction across slice boundaries is prohibited, just as context selections or the like is.

These are, altogether, three examples for spatial segments: slices, tiles and WPP substreams. Additionally all three parallelization concepts, tiles, WPP substreams and slices, can be used in combination, i.e. picture 12 or picture 15 can be split into tiles, where each tile is split into multiple WPP substreams. Also slices can be used to partition the bitstream into multiple NAL units for instance (but not restricted to) at tile or WPP boundaries. If a picture 12, 15 is partitioned using tiles or WPP substreams and, additionally, using slices, and slice partitioning deviates from the other WPP/tile partitioning, then spatial segment shall be defined as the smallest independently decodable section of the picture 12,15. Alternatively a restriction may be imposed on the bitstream which combination of concepts may be used within a picture (12 or 15) and/or if borders have to be aligned between the different used concepts.

Various prediction modes supported by encoder and decoder as well as restrictions imposed onto prediction modes as well as context derivation for entropy coding/decoding in order to enable the parallel processing concepts, such as the tile and/or WPP concept, have been described above. It has also been mentioned above that encoder and decoder may operate on a block basis. For example, the above explained prediction modes are selected on a block basis, i.e. at a granularity finer than the pictures themselves. Before proceeding with describing aspects of the present application, a relation between slices, tiles, WPP substreams and the just mentioned blocks in accordance with an embodiment shall be explained.

Figure 4:
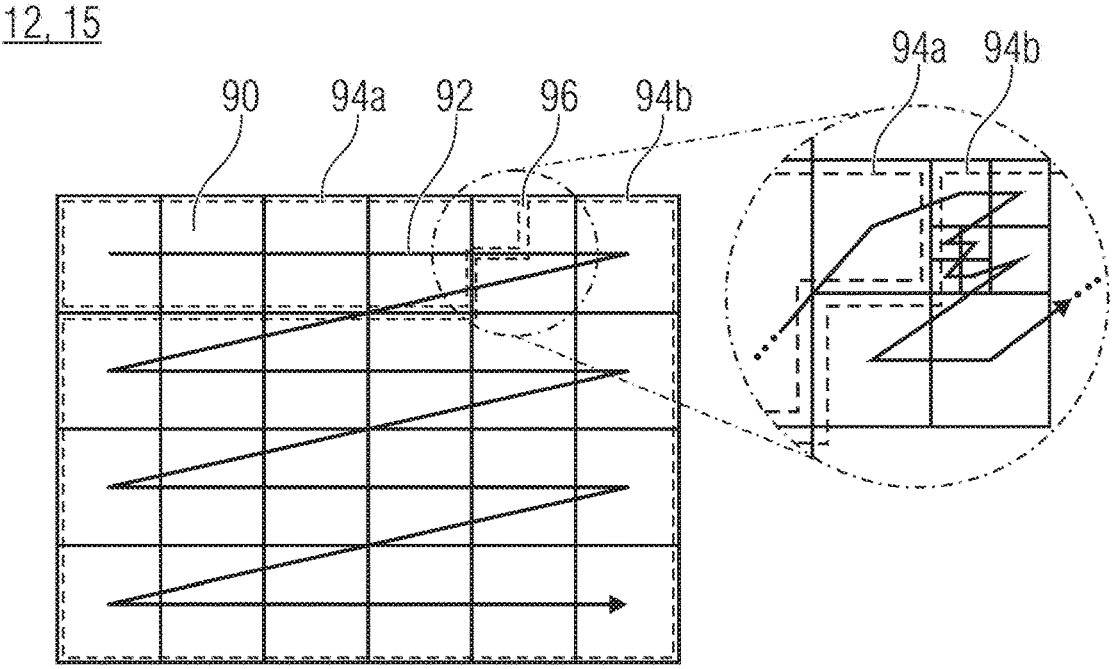
FIG. 4 shows a schematic diagram illustrating a picture of any layer, subdivided into blocks with indicating a further subdivision of the picture into spatial segments.

FIG. 4 shows a picture which may be a picture of layer 0, such as layer 12 or a picture of layer 1 such as picture 15. The picture is regularly subdivided into an array of blocks 90. Sometimes, these blocks 90 are called largest coding blocks (LCB), largest coding units (LCU), coding tree blocks (CTB) or the like. The subdivision of the picture into blocks 90 may form a kind of base or coarsest granularity at which the above described predictions and residual codings are performed and this coarsest granularity, i.e. the size of blocks 90, may be signaled and set by the encoder, individually for layer 0 and layer 1. For example, a multi-tree such as a quad-tree subdivision may be used and signaled within the data stream so as to subdivide each block 90 into prediction blocks, residual blocks and/or coding blocks, respectively. In particular, coding blocks may be the leaf blocks of a recursive multi-tree subdivisioning of blocks 90 and some prediction related decisions may be signaled at the granularity of coding blocks, such as prediction modes, and the prediction blocks at the granularity of which the prediction parameters such as motion vectors in case of temporal inter prediction and disparity vectors in case of inter layer prediction for example, is coded and residual blocks at the granularity of which the prediction residual is coded, may be the leaf blocks of separate recursive multi-tree subdivisionings of the code blocks.

A raster scan coding/decoding order 92 may be defined among blocks 90. The coding/decoding order 92 restricts the availability of neighboring portions for the purpose of spatial prediction: merely portions of the picture which according to the coding/decoding order 92 precede the current portion such as block 90 or some smaller block thereof, to which a currently to be predicted syntax element relates, are available for spatial prediction within the current picture. Within each layer, the coding/decoding order 92 traverses all blocks 90 of the picture so as to then proceed with traversing blocks of a next picture of the respective layer in a picture coding/decoding order which not necessarily follows the temporal reproduction order of the pictures. Within the individual blocks 90, the coding/decoding order 92 is refined into a scan among the smaller blocks, such as the coding blocks.

In relation to the just outlined blocks 90 and the smaller blocks, each picture is further subdivided into one or more slices along the just mentioned coding/decoding order 92. Slices 94a and 94b exemplarily shown in FIG. 4 accordingly cover the respective picture gaplessly. The border or interface 96 between consecutive slices 94a and 94b of one picture may or may not be aligned with borders of neighboring blocks 90. To be more precise, and illustrated at the right hand side of FIG. 4, consecutive slices 94a and 94b within one picture may border each other at borders of smaller blocks such as coding blocks, i.e. leaf blocks of a subdivision of one of blocks 90.

Slices 94a and 94b of a picture may form the smallest units in which the portion of the data stream into which the picture is coded may be packetized into packets, i.e. NAL units. A further possible property of slices, namely the restriction onto slices with regards to, for example, prediction and entropy context determination across slice boundaries, was described above. Slices with such restrictions may be called "normal" slices. As outlined in more detail below, besides normal slices "dependent slices" may exist as well.

Figure 5:
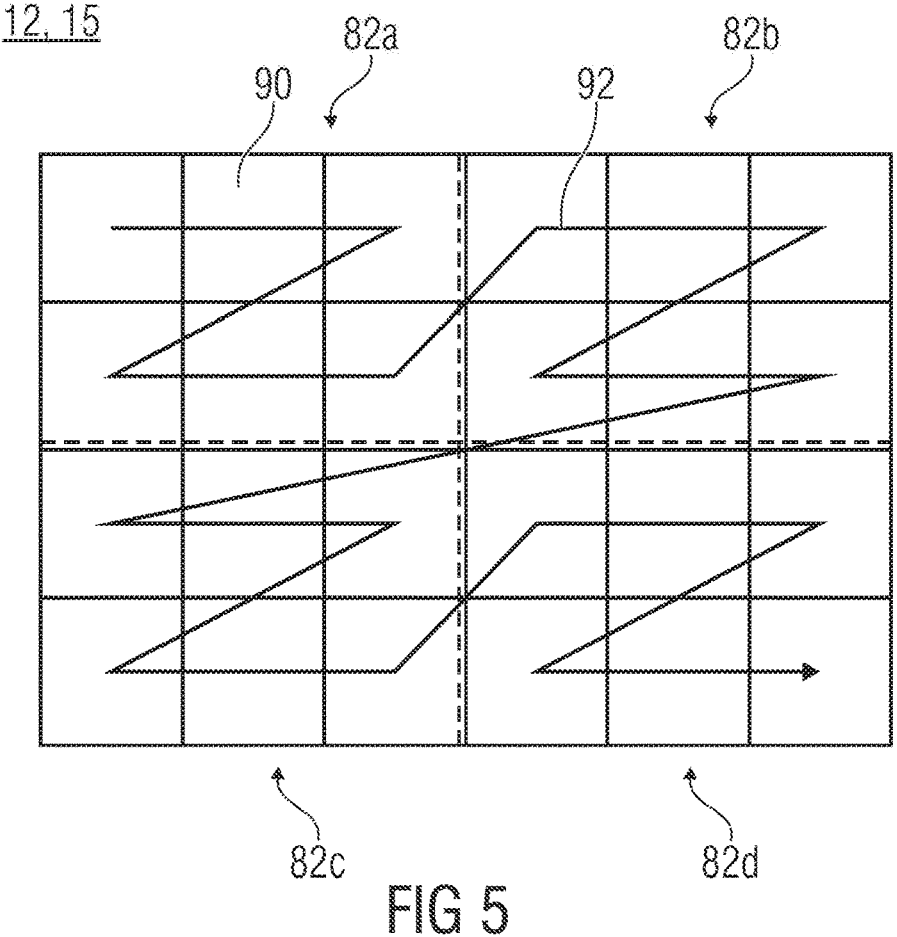
FIG. 5 shows a schematic diagram of a picture of any layer, subdivided into blocks and tiles.

The coding/decoding order 92 defined among the array of blocks 90 may change if the tile partitioning concept is used for the picture. This is shown in FIG. 5 where the picture is exemplarily shown to the partitioned into four tiles 82a to 82d. As illustrated in FIG. 5, tiles are themselves defined as a regular subdivision of a picture in units of blocks 90. That is, each tile 82a to 82d is composed of an array of n×m blocks 90 with n being set individually for each row of tiles and m being individually set for each column of tiles. Following the coding/decoding order 92, blocks 90 in a first tile are scanned in raster scan order first before proceeding to the next tile 82b and so forth, wherein the tiles 82a to 82d are themselves scanned in a raster scan order.

Figure 6:
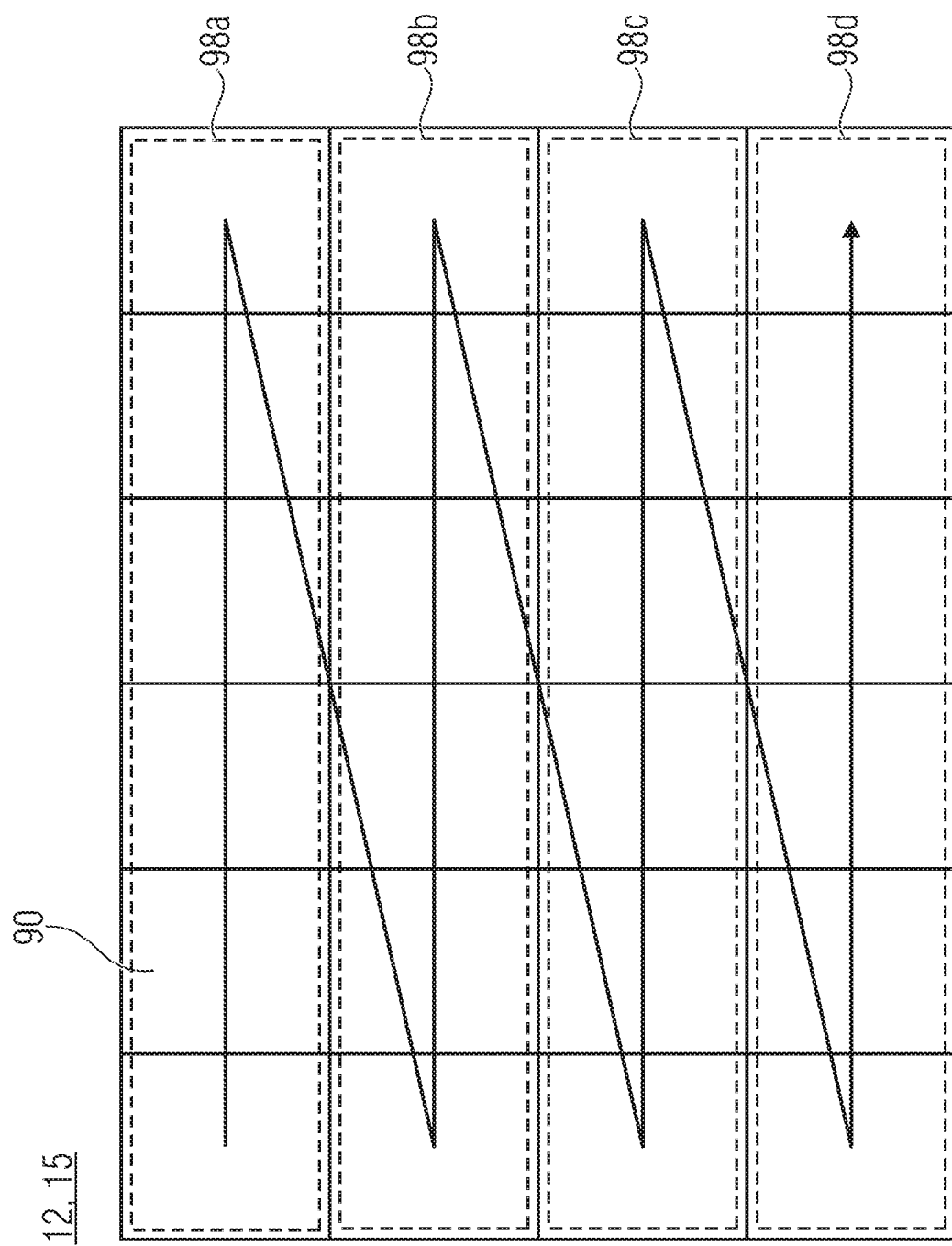
FIG. 6 shows a schematic diagram of a picture subdivided into blocks and substreams.

In accordance with a WPP stream partitioning concept, a picture is, along the coding/decoding order 92, subdivided in units of one or more rows of block 90 into WPP substreams 98a to 98d. Each WPP substream may, for example, cover one complete row of blocks 90 as illustrated in FIG. 6.

The tile concept and the WPP substream concept may, however, also be mixed. In that case, each WPP substream covers, for example one row of blocks 90 within each tile.

Even the slice partitioning of a picture may be co-used with the tile partitioning and/or WPP substream partitioning. In relation to tiles, each of the one or more slices the picture is subdivided into may either be exactly composed of one complete tile or more than one complete tile, or a subportion of merely one tile along the coding/decoding order 92. Slices may also be used in order to form the WPP substreams 98a to 98d. To this end, slices forming the smallest units for packetization may comprise normal slices on the one hand and dependent slices on the other hand: while normal slices impose the above-described restrictions onto prediction and entropy context derivation, dependent slices do not impose such restrictions. Dependent slices which start at the border of the picture from which the coding/decoding order 92 substantially points away rowwise, adopt the entropy context as resulting from entropy decoding block 90 in the immediately preceding row of blocks 90, and dependent slices starting somewhere else may adopt the entropy coding context as resulting from entropy coding/decoding the immediately preceding slice up to its end. By this measure, each WPP substream 98a to 98d may be composed of one or more dependent slices.

That is, the coding/decoding order 92 defined among blocks 90 linearly leads from a first side of the respective picture, here exemplarily the left side, to the opposite side, exemplarily the right side, and then steps to the next row of blocks 90 in downward/bottom direction. Available, i.e. already coded/decoded portions of the current picture, accordingly lie primarily to the left and to the top of the currently coded/decoded portion, such as the current block 90. Due to the disruption of predictions and entropy context derivations across tile boundaries, the tiles of one picture may be processed in parallel. Coding/decoding of tiles of one picture may even be commenced concurrently. Restrictions stem from the in-loop filtering mentioned above in case where same is allowed to cross tile boundaries. Commencing the coding/decoding of WPP substreams, in turn, is performed in a staggered manner from top to bottom. The intra-picture delay between consecutive WPP substreams is, measured in blocks 90, two blocks 90.

However, it would be favorable to even parallelize the coding/decoding of pictures 12 and 15, i.e. the time instant of different layers. Obviously, coding/decoding the picture 15 of the dependent layer has to be delayed relative to the coding/decoding of the base layer so as to guarantee that there are "spatially corresponding" portions of the base layer already available. These thoughts are valid even in case of not using any parallelization of coding/decoding within any of pictures 12 and 15 individually. Even in case of using one slice in order to cover the whole picture 12 and 15, respectively, with using no tile and no WPP substream processing, coding/decoding of pictures 12 and 15 may be parallelized. The signaling described next, i.e. aspect six, is a possibility to express such decoding/coding delay between layers even in such a case where, or irrespective of whether, tile or WPP processing is used for any of the pictures of the layers.

Before discussing the above mentioned concept of the present application, again referring to FIGS. 1 and 2, it should be noted that the block structure of the encoder and decoder in FIGS. 1 and 2 is merely for illustration purposes and the structure may also be different.

There are applications such as video conferencing and industrial surveillance applications where the end-to-end delay should be as low as possible wherein, however, multi-layered (scalable) coding is still of interest. The embodiments described further below allow for a lower end-to-end delay in multi-layer video coding. In this regard, it should also be noted that the embodiments described hereinafter are not restricted to multi-view coding. The multiple layers mentioned hereinafter may involve different views, but may also represent the same view at varying degrees of spatial resolutions, SNR accuracy or the like. Possible scalability dimensions along which the below discussed multiple layers increase the information content conveyed by the previous layers are manifold and comprise, for example, the number of views, spatial resolution and SNR accuracy.

As described above, NAL units are composed of slices. Tile and/or WPP concepts are free to be chosen individually for the different layers of a multi-layered video data stream. Accordingly, each NAL unit having a slice packetized thereinto may be spatially attributed to the area of a picture which the respective slice refers to. Accordingly, in order to enable low delay coding in case of inter-layer prediction it would be favorable to be able to interleave NAL units of different layers pertaining to the same time instant in order to allow for encoder and decoder to commence encoding and transmitting, and decoding, respectively, the slices packetized into these NAL units in a manner allowing parallel processing of these pictures of the different layers, but pertaining to the same time instant. However, depending on the application, an encoder may advantageously use the ability to use different coding orders among the pictures of the different layers, such as the use of different GOP structures for the different layers, over the ability to allow for parallel processing in layer dimension. A construction of a data stream according to a comparison embodiment is described hereinafter with respect to FIG. 7.

Figure 7:
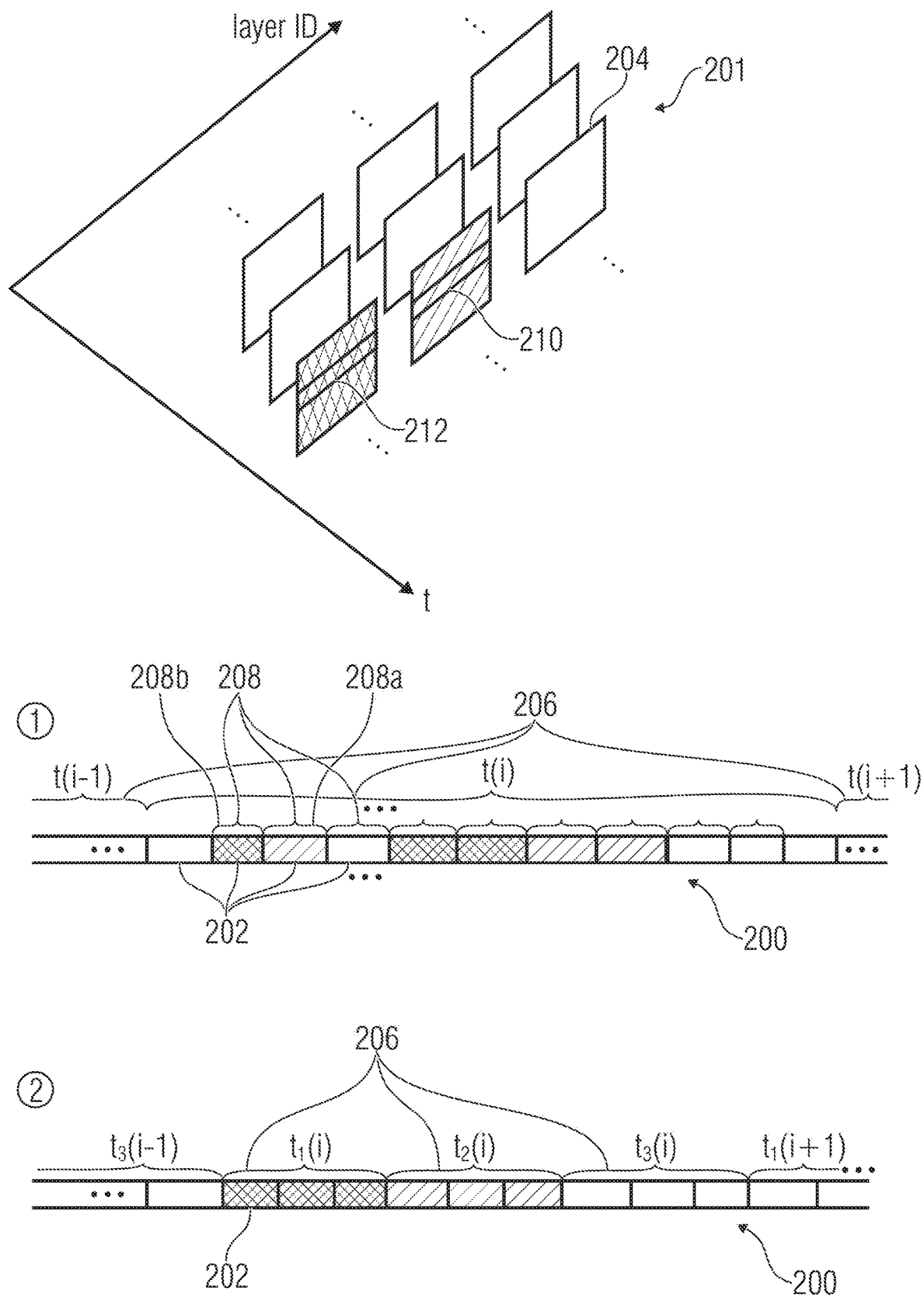
FIG. 7 shows a schematic diagram of a multi-layered video data stream, here exemplarily comprising three layers, wherein options 1 and 2 for arranging NAL units belonging to a respective time instant and a respective layer within the data stream are illustrated in the bottom half of FIG. 7.

FIG. 7 shows a multi-layered video material 201 composed of a sequence of pictures 204 for each of different layers. Each layer may describe a different property of this scene (video content) described by the multi-layered video material 201. That is, the meaning of the layers may be selected among: color component, depth map, transparency and/or view point, for example. Without losing generality, let us assume that the different layers correspond to different views with video material 201 being a multi-view video.

In case of the application necessitating low delay, the encoder may decide to signal a long-term high level syntax element. In that case, the data stream generated by the encoder may look like indicated in the middle of FIG. 7 at the one with the circle around it. In that case, the multi-layered video stream 200 is composed of the sequence of NAL units 202 such that NAL units 202 belonging to one access unit 206 relate to pictures of one temporal time instant, and NAL units 202 of different access units relate to different time instants. That is, an access unit 206 collects NAL units 202 of one time instant, namely the one associated with the access unit 206. Within each access unit 206, for each layer, at least some of the NAL units relating to the respective layer are grouped into one or more decoding units 208. This means the following: among the NAL units 202 there are, as indicated above, NAL units of different types, such as VCL NAL units on the one hand and non-VCL NAL units on the other hand. Speaking more specifically, NAL units 202 may be of different types, and these types may comprise:

1) NAL units carrying slices, tiles, WPP substreams or the like, i.e. syntax elements concerning prediction parameters and/or residual data describing picture content on a picture sample scale/granularity. One or more such types may be present. VCL NAL units are of such type. Such NAL units are not removable.
2) Parameter set NAL units may carry infrequently changing information such as long-term coding settings, some examples of which have been described above. Such NAL units may be interspersed within the data stream to some extent and repeatedly, for example;
3) Supplementary enhancement information (SEI) NAL units may carry optional data.

As alternative for the term "NAL unit", "packet" is sometimes used in the following with denoting NAL units of the first type, i.e. VCL units, "payload packets", while "packets" also encompass non-VCL units to which packets of type 2 and 3 of above list belong.

Decoding units may be composed of the first of the above mentioned NAL units. To be more precise, decoding units may consist of "of one or more VCL NAL units in an access unit and the associated non-VCL NAL units." Decoding units thus describe a certain area of one picture, namely the area encoded into the one or more slices contained therein.

The decoding units 208 of NAL units which relate to different layers, are interleaved so that, for each decoding unit, inter-layer prediction used to encode the respective decoding unit is based on portions of pictures of layers other than the layer the respective decoding unit relates to, which portions are coded into decoding units preceding the respective decoding unit within the respective access unit. See, for example, decoding unit 208a in FIG. 7. Imagine that this decoding unit relates to the area 210 of the respective picture of dependent layer 2 and a certain time instant, exemplarily. The co-located area in the base layer picture of the same time instant is denoted by 212 and an area of this base layer picture slightly exceeding this area 212 could be necessitated in order to completely decode decoding unit 208a by exploiting inter-layer prediction. The slight exceeding may be the result of disparity-compensated prediction, for example. This in turn means that the decoding unit(s) 208b, which precedes decoding unit 208a within access unit 206, should cover the area needed for inter-layer prediction completely. Reference is made to the above description concerning the delay indication which could be used as a boundary for the interleaving granularity.

If, however, the application takes more advantage of the freedom to differently choose the decoding orders of the pictures among the different layers, the encoder may advantageously use the case depicted at the bottom of FIG. 7 at the 2 with the circle around it. In this case, the multi-layered video data stream has individual access units for each picture belonging to a certain pair of one or more values of layer ID and a single temporal time instant. As shown in FIG. 7, at the (i−1)-th decoding order, i.e. time instant t(i−1), each layer may consist of an access unit $AU_1$, $AU_2$ (and so on) or not (c.p time instant t(i)) where all layers are contained in a single access unit AU'. However, interleaving is not allowed in this case. The access units are arranged in the data stream 200 following the decoding order index i, i.e. the access units of decoding order index i for each layer, followed by the access units concerning the pictures of these layers corresponding to decoding order i+1 and so forth. A temporal inter-picture prediction signaling in the data stream signals as to whether equal coding order or different picture coding orders apply for the different layers, and the signaling may, for example, be placed within one or even redundantly within more than one position within the data stream such that within the slices packetized into the NAL units. In other words, case 2 subdivides the access unit scope: a separate access unit is opened for each pair of time instant and layer.

As to the NAL unit types, it shall be noted that the ordering rules defined thereamong may enable a decoder to decide where borders between consecutive access units are positioned irrespective of NAL units of a removable packet type having been removed during transmission or not. NAL units of the removable packet type may, for example, comprise SEI NAL units, or redundant picture data NAL units or other specific NAL unit types. That is, the borders between access units do not move but remain, and still, the ordering rules are obeyed within each access unit, but broken at each boundary between any two access units.

Figure 16:
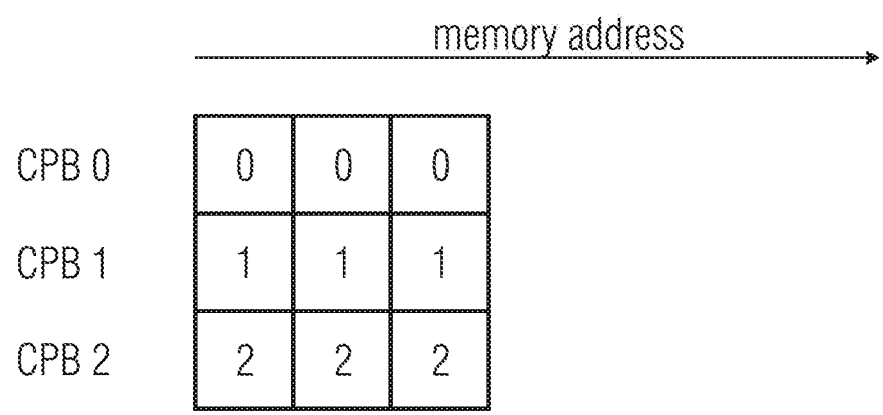
FIG. 16 shows a schematic diagram illustrating memory address illustration with respect to multiple CPBs in accordance with an embodiment.
Figure 18:
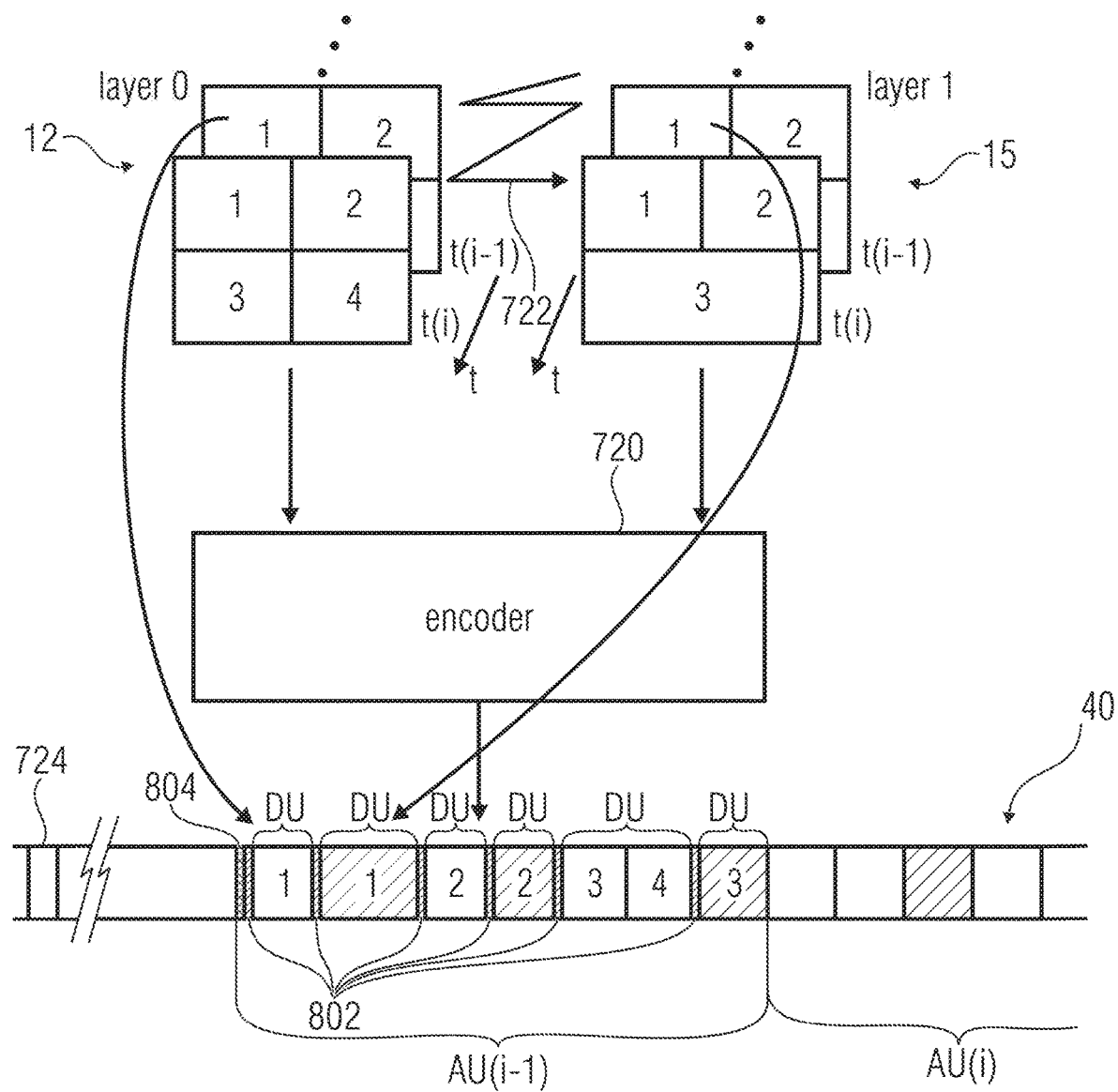

For sake of completeness, FIG. 18 illustrates that case 1 of FIG. 7, allows that the packets belonging to different layers, but the same time instant t(i−1), for example, are distributed within one access unit. The case 2 of FIG. 16 is likewise depicted at 2 with a circle around it.

The fact as to whether the NAL units contained within each access unit are actually interleaved or not with respect to their association with the layers of the data stream may be decided at the encoder's discretion. In order to ease the handling of the data stream, a syntax element may signal the interleaving or non-interleaving of the NAL units within an access unit collecting all NAL units of a certain time stamp, to the decoder so that the latter may more easily process the NAL units. For example, whenever interleaving is signaled to be switched on, the decoder could use more than one coded picture buffer as briefly illustrated with respect to FIG. 9.

Figure 9:
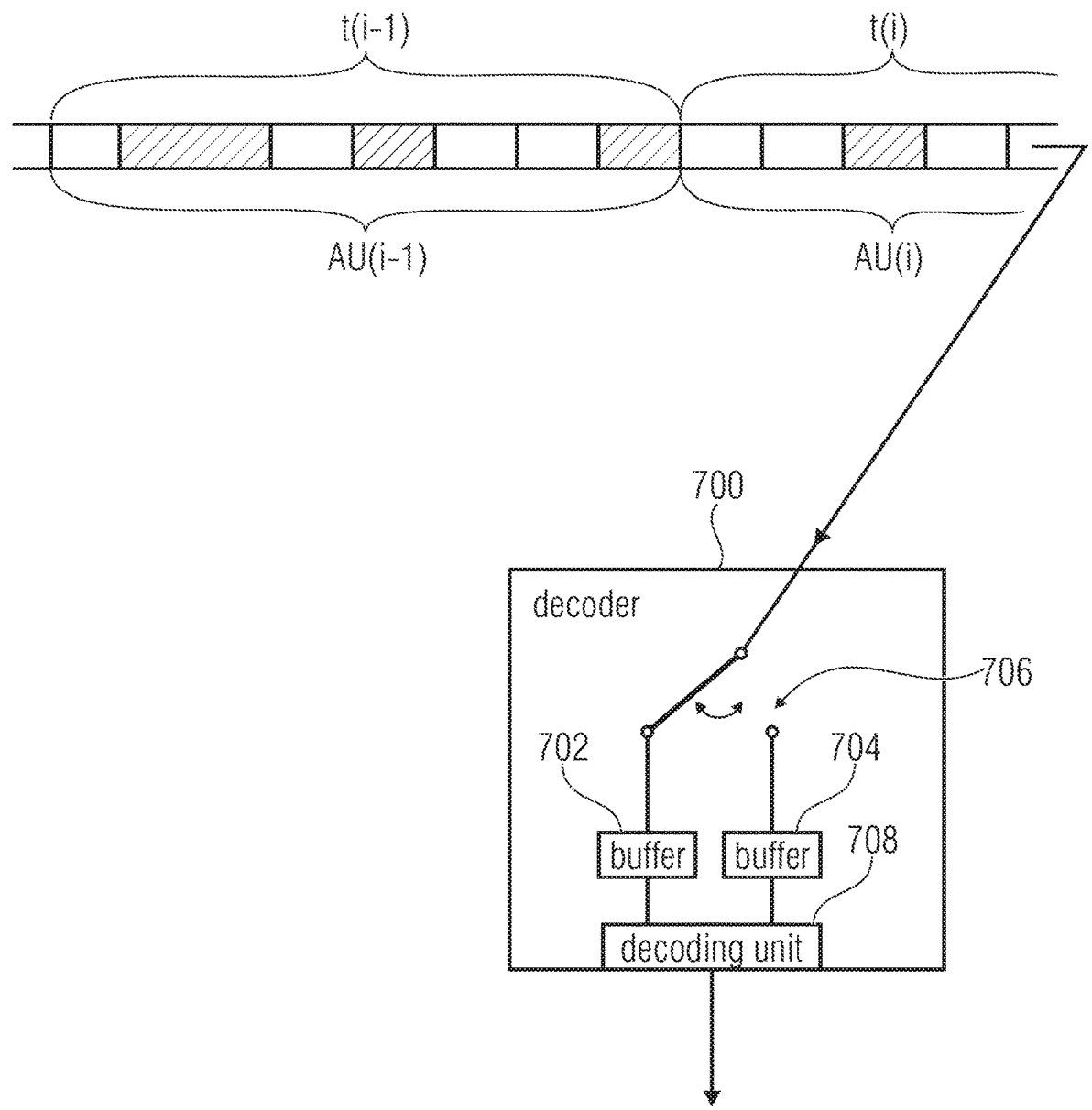
FIG. 9 shows a schematic block diagram of a decoder configured to process multi-layered video data streams according to FIGS. 7 and 8 of option 1, as a comparison embodiment.

FIG. 9 shows a decoder 700 which may be embodied as outlined above with respect to FIG. 2. Exemplarily, the multi-layered video data stream of FIG. 9, option 1 with a circle around it, is shown as entering decoder 700. In order to more easily perform the deinterleaving of the NAL units belonging to different layers, but a common time instant, per access unit AU, decoder 700 uses two buffers 702 and 704, with a multiplexer 706 forwarding, for each access unit AU, the NAL units of that access unit AU, which belong to a first layer to buffer 702, for example, and NAL units belonging to a second layer to buffer 704, for example. A decoding unit 708 then performs the decoding. For example, in FIG. 9, NAL units belonging to base/first layer are, for example, shown as not-hatched, whereas NAL units of a dependent/second layer are shown using hatching. If the above-outlined interleaving signaling is present in the data stream, the decoder 700 may be responsive to this interleaving signaling in the following manner: if the interleaving signaling signals NAL unit interleaving to be switched on, i.e. NAL units of different layers are interleaved with each other within one access unit AU, and the decoder 700 uses buffers 702 and 704 with a multiplexer 706 distributing the NAL units onto these buffers as just outlined. If not, however, decoder 700 merely uses one of the buffers 702 and 704 for all NAL units comprised by any access unit, such as buffer 702, for example.

In order to understand the embodiment of FIG. 9 more easily, reference is made to FIG. 9 along with FIG. 10, with FIG. 10 showing an encoder configured to generate a multi-layer video data stream as outlined above. The encoder of FIG. 10 is generally indicated using reference signs 720 and encodes the inbound pictures of here, exemplarily, two layers which are, for the ease of understanding, indicated as layer 12, forming a base layer, and layer 1, forming a dependent layer. They may, as previously outlined, form different views. A general encoding order along which encoder 720 encodes the pictures of layers 12 and 15, scans the pictures of these layers substantially along their temporal (presentation time) order wherein the encoding order 722 may, in units of groups of pictures, deviate from the presentation time order of the pictures 12 and 15. At each temporal time instant, the encoding order 722 passes the pictures of layers 12 and 15 along their dependency, i.e. from layer 12 to layer 15.

The encoder 720 encodes the pictures of layers 12 and 15 into the data stream 40 in units of the aforementioned NAL units, each of which is associated with a part of a respective picture in a spatial sense. Thus, NAL units belonging to a certain picture subdivide or partition, the respective picture spatially and as already described, the inter-layer prediction renders portions of pictures of layer 15 dependent on portions of time-aligned pictures of layer 12 which are substantially co-located to the respective portion of the layer 15 picture with "substantially" encompassing disparity displacements. In the example of FIG. 10, the encoder 720 has chosen to exploit the interleaving possibility in forming the access units collecting all NAL units belonging to a certain time instant. In FIG. 10, the portion out of data stream 40 illustrated corresponds to the one inbound to the decoder of FIG. 9. That is, in the example of FIG. 10, the encoder 720 uses inter-layer parallel processing in encoding layers 12 and 15. As far as time instant t(i−1) is concerned, the encoder 720 starts encoding the picture of layer 1 as soon as NAL unit 1 of the picture of layer 12 has been encoded. Each NAL unit, the encoding of which has been completed, is output by encoder 720, provided with an arrival time stamp which corresponds to the time the respective NAL unit has been output by encoder 720. After encoding the first NAL unit of the picture of layer 12 at time instant t(i−1), encoder 720 proceeds with encoding the content of the picture of layer 12 and outputs the second NAL unit of layer's 12 picture, provided with an arrival time stamp succeeding the arrival time stamp of the first NAL unit of the time-aligned picture of layer 15. That is, the encoder 720 outputs the NAL units of the pictures of layers 12 and 15, all belonging to the same time instant, in an interleaved manner, and in this interleaved manner, the NAL units of data stream 40 are actually transmitted. The circumstance that the encoder 720 has chosen to exploit the possibility of interleaving, may be indicated by encoder 720 within data stream 40 by way of the respective interleaving signaling 724. As the encoder 720 is able to output the first NAL unit of the dependent layer 15 of time instant t(i−1) earlier than compared to the non-interleaved scenario according to which the output of the first NAL unit of layer 15 would be deferred until the completion of the encoding and outputting of all NAL units of the time-aligned base layer picture, the end-to-end delay between the decoder FIG. 9 and the encoder FIG. 10 may be reduced.

As already mentioned above, in accordance with an alternative example, in the case of non-interleaving, i.e. in case of signaling 724 indicating the non-interleaved alternative, the definition of the access units may remain the same, i.e. access units AU may collect all NAL units belonging to a certain time instant. In that case, signaling 724 merely indicates whether within each access unit, the NAL units belonging to different layers 12 and 15 are interleaved or not.

As described above, depending on the signaling 724, the decoding of FIG. 9 either uses one buffer or two buffers. In the case of interleaving switched on, decoder 700 distributes the NAL units onto the two buffers 702 and 704 such that, for example, NAL units of layer 12 are buffered in buffer 702, while the NAL units of layer 15 are buffered in buffer 704. The buffers 702 and 704 are emptied access unit wise. This is true in case of both signaling 724 indicating interleaving or non-interleaving.

It is of advantage if the encoder 720 sets the removal time within each NAL unit such that the decoding unit 708 exploits the possibility of decoding layers 12 and 15 from the data stream 40 using interlayer parallel processing. The end-to-end delay, however, is already reduced even if the decoder 700 does not apply inter-layer parallel processing.

As already described above, NAL units may be of different NAL unit type. Each NAL unit may have a NAL unit type index indicating the type of the respective NAL unit out of a set of possible types, and within each access unit, the types of the NAL units of the respective access unit may obey an ordering rule among the NAL unit types while merely between two consecutive access units, the ordering rule is broken, so that the decoder 700 is able to identify access unit borders by surveying this rule. For more information reference is made to the H.264 Standard.

With respect to FIGS. 9 and 10, decoding units, DU, are identifiable as runs of consecutive NAL units within one access unit, which belong to the same layer. The NAL units indicated "3" and "4" in FIG. 10 in the access unit AU(i−1), for example, form one DU. The other decoding units of access unit AU(i−1) all comprise merely one NAL unit.

Figure 19:
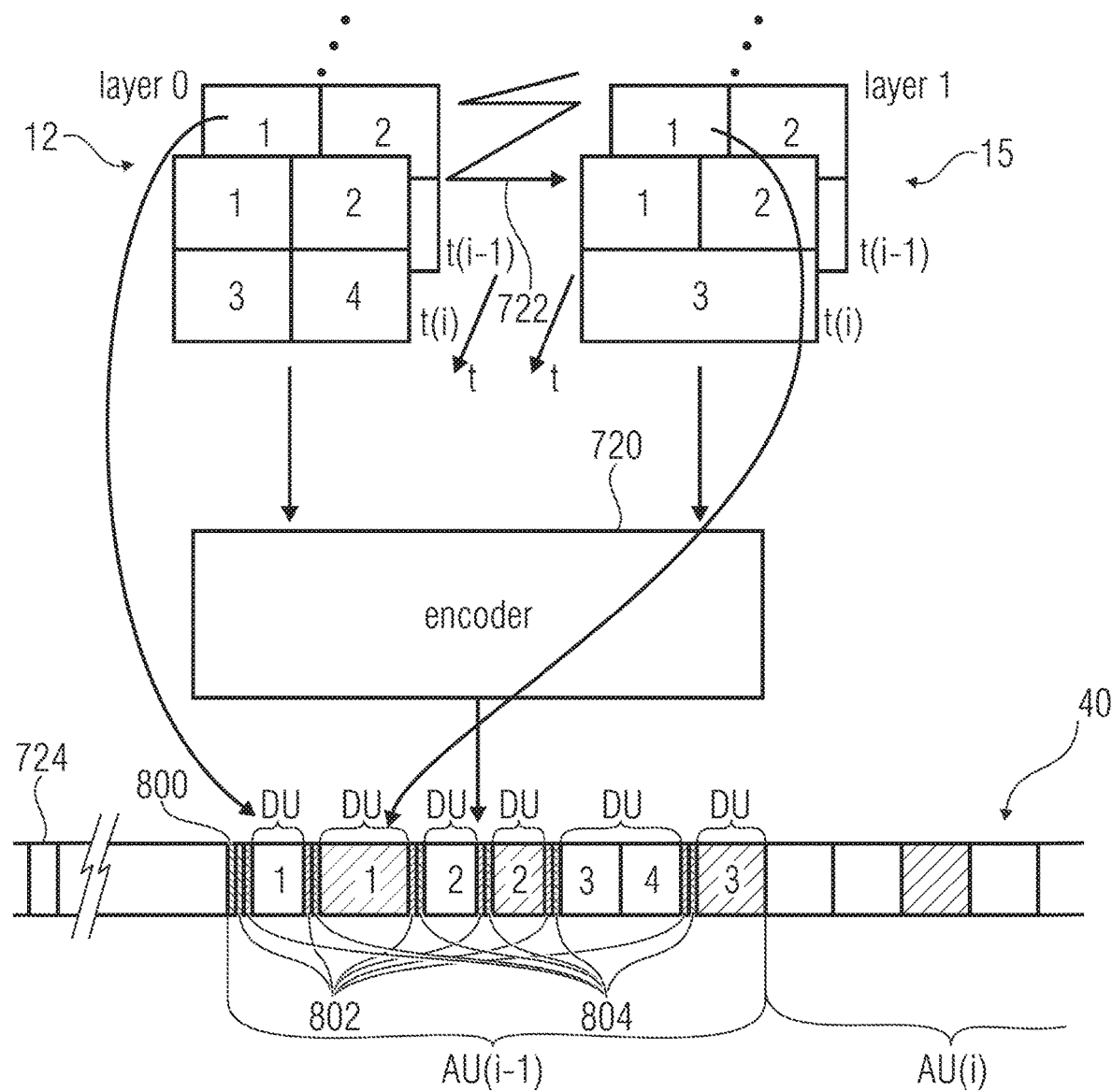

Together, access unit AU(i−1) of FIG. 19 exemplarily comprises six decoding units DU which are alternately arranged within access unit AU(i−1), i.e. they are composed of runs of NAL units of one layer with the one layer alternately changing between layer 1 and layer 0.

FIG. 7 to FIG. 10 provided mechanisms to enable and control CPB operations in a multi-layer video codec that satisfy ultra-low delay requirements as possible in current single layer video codecs such as HEVC. Based on the bitstream order that was described in the just-mentioned figures, the following describes a video decoder that operates an incoming bitstream buffer, i.e. coded picture buffer at a decoding unit level, wherein, in addition, the video decoder operates multiple CPBs at a DU level. In particular, in a manner also applicable to the HEVC extensions, an operation mode is described where additional timing information is provided for operation of multi-layer codecs in a low delay manner. This timing provides a control mechanism of the CPB for interleaved decoding of the different multiple layers in the stream.

In the embodiments described hereinafter, the case 2 of FIG. 7 and FIG. 10 is not needed or, in other words, needs not to be realized: The access unit may remain its function as a container collecting all payload packets (VCL NAL units) carrying information on pictures—irrespective of what layer—belong to a certain time stamp or instant. Nevertheless, the embodiments described hereinafter achieve a compatibility with decoder of different types or decoders advantageously using different strategies in decoding inbound multi-layered video data streams.

That is, video encoder and decoders described below are still scalable, multi-view or 3D video encoders and decoders. The term layer is in compliance with the above description collectively used for scalable video coding layers as well as for views and/or depth maps of a multi-view coded video stream.

The DU based decoding mode, i.e. DU CPB removal in a consecutive fashion, can, according to some of the below outlined embodiments, still be used by single layer (base spec) ultra-low delay decoder. Multi-layer ultra-low delay decoders will use the interleaved DU based mode decoding to achieve low-delay operation on multiple layers as described with respect to case 1 in FIG. 7 and FIG. 10 and the subsequent figures, while multi-layer decoders that do not decode interleaved DUs can fall back to, according to various embodiments, the AU based decoding process or to a DU based decoding in a non-interleaved fashion, which would provide a low-delay operation in between the interleaved approach and the AU based approach. The resulting three operation modes are:

AU based decoding: all DUs of an AU are removed from the CPB at the same time.

Consecutive DU based decoding: each DU of a multi-layer AU is attributed a CPB removal time which complies with DU removal in consecutive order of layers, i.e. all DUs of layer m are removed from the CPB before DUs of layer (m+1) are removed from the CPB.

Interleaved DU based decoding: each DU of a multi-layer AU is attributed a CPB removal time which complies with DU removal in interleaved order across layers, i.e. DUs of layer m may be removed from the CPB later than DUs of layer (m+1) are removed from the CPB.

The additional timing information for interleaved operation allows a system layer device to determine the arrival time at which a DU arrives at the CPB, when the sender sends the multi-layer data in an interleaved manner, irrespective of the decoder operation mode, which is needed for a correct operation of a decoder to prevent buffer overflows and underflows. How the system layer device (e.g. an MPEG-2 TS receiver) can determine the time at which the data arrives at the decoders CPB is exemplarily shown at the end of the following section Single CPB operation.

The following table in FIG. 11 gives an exemplary embodiment that signals the presence in the bitstream of DU timing information for operation in an interleaved mode.

Another embodiment would be an indication that the DU timing information provided correspond to an interleaved operation mode, so that devices unable to operate in interleaved DU mode operate in AU mode and can ignore the DU timing.

Additionally, another operation mode that features per-layer DU based CPB removal, i.e. DU CPB removal in an non-interleaved fashion across layers is done allowing the same low-delay CPB operation on DUs as in the interleaved mode for the base layer, but removes the DUs from layer (m+1) only after finishing removal of the DUs of layer m. Therefore, non-base layer DUs may remain for a longer time period in the CPB than when removed in the interleaved CPB operation mode. The tables in FIGS. 12a and 12b give an exemplary embodiment that signals the additional timing information as extra SEI messages, either on AU level or on DU level. Other possibilities include indication that timing provided by other means leads to CPB removal from the CPB that is interleaved across layers.

A further aspect is the possibility of applying the mentioned decoder operation modes for the following two cases:
1. A single CPB used to accommodate the data of all layers. NAL units of different layers within the access unit may be interspersed. This operation mode is referred to as Single CPB operation in the following.
2. One CPB per layer. NAL units of each layer are located in consecutive positions. This operation mode is referred to as Multi CPB operation in the following.

1. Single CPB Operation

Figure 13:
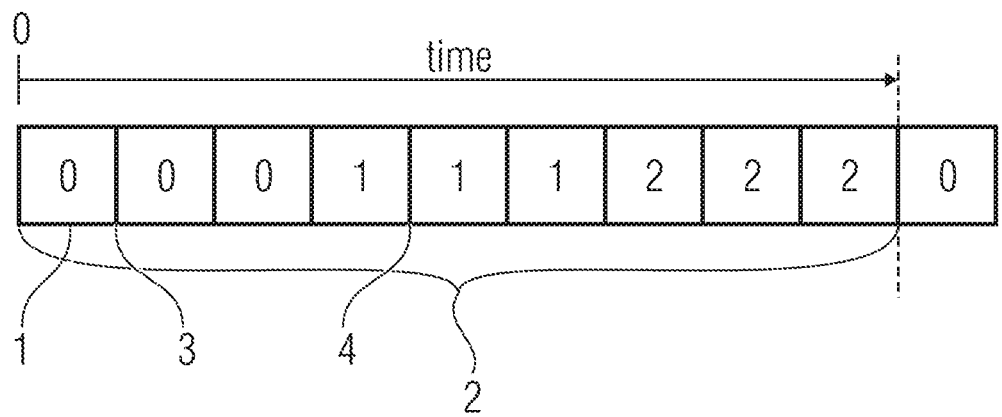
FIG. 13 shows a schematic diagram of a bitstream order of DUs of three layers over time, with the layer index being illustrated as inscribed numbers 0 to 2.

In FIG. 13 the arrival of decoding units (1) of an access unit (2) is shown for a layer-wise ordered bitstream. The numbers in the box refers to the ID of the layer. As shown, first all DUs of layer 0 arrive, followed by DUs of layer 1 and then layer 2. In the example three layers are shown, but further layer could follow.

Figure 8:
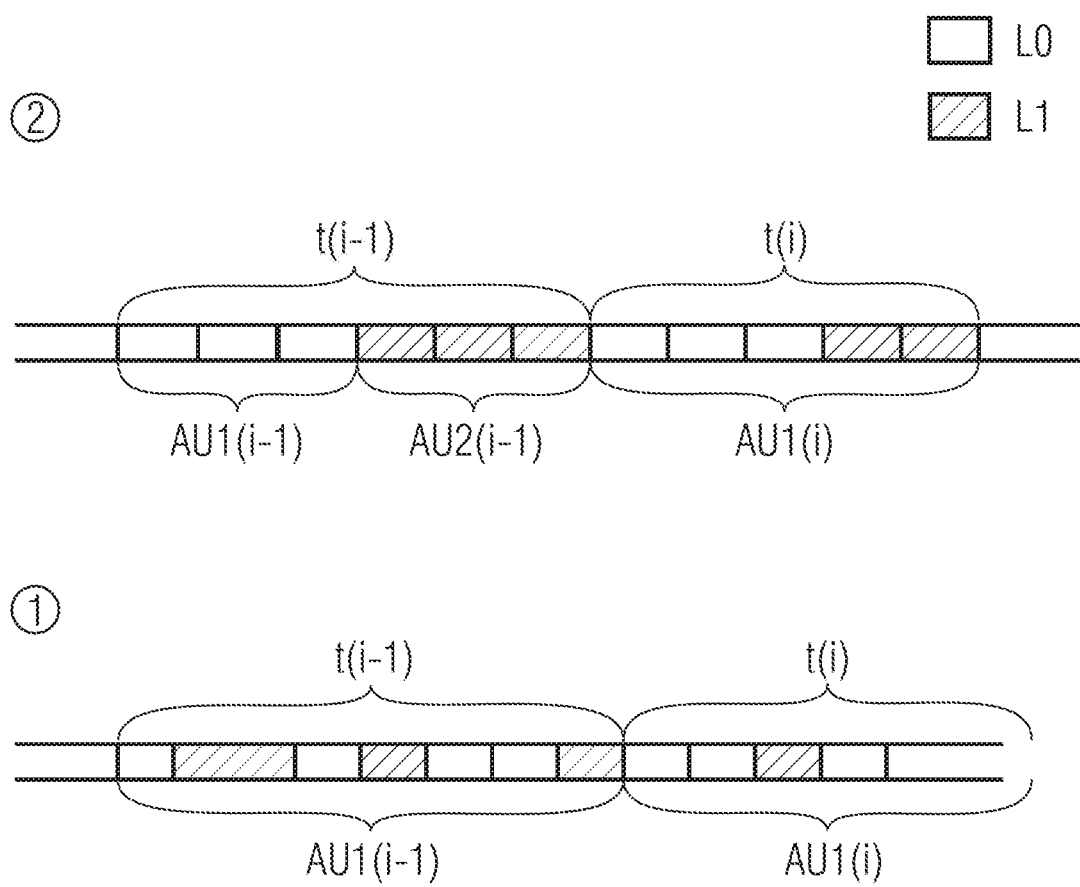
FIG. 8 shows a schematic diagram of a portion out of a data stream with illustrating these two options in the exemplary case of two layers.
Figure 14:
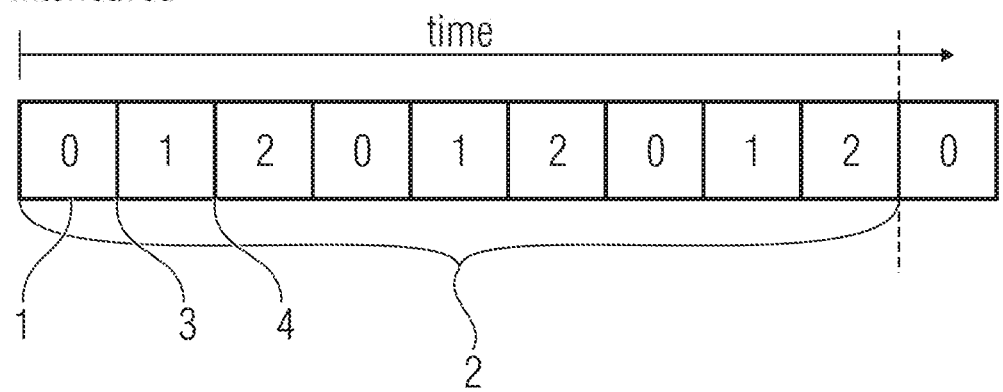
FIG. 14 shows a schematic diagram of the bitstream order of DUs of three layers over time wherein, in comparison to FIG. 13, the DUs are interleaved.

In FIG. 14 the arrival of decoding units (1) of an access unit (2) is shown for an interleaved bitstream according to FIGS. 7 and 8, case 1. The numbers in the box refer to the ID of the layer. As shown, DUs of different layers can be mixed within the access unit.

A CPB removal time is associated with each decoding unit which is the start time of the decoding process. This decoding time cannot be lower than the final arrival time of a decoding unit, exemplarily shown as (3) for the first decoding unit. The final arrival time of the first decoding unit of the second layer, which is labelled with (4), can be lowered by using an interleaved bitstream order as shown in FIG. 14.

An embodiment is a video encoder that creates a decoder hint within the bitstream that indicates the lowest possible CPB removal (and thus decoding times) in the bitstream using high-level syntax elements for interleaved bitstreams.

A decoder that makes use of the described decoder hint for lower arrival time removes the decoding units from the CPB directly at or shortly after their arrival. Thus a part of the picture can be decoded completely (through all layers) earlier and thus be displayed earlier than for non-interleaved bitstreams.

A lower cost implementation of such a decoder can be achieved by constraining the signaled timing in the following way: for any DU n that precedes the DU m in bitstream order, the CPB removal time for DU n shall be lower or equal to the CPB removal time of DU m. When arriving packets are stored at consecutive memory addresses in the CPB (typically in a ring buffer), this constraint avoids a fragmentation of the free memory in the CPB. The packets are removed in the same order as they are received. A decoder can be implemented that only keeps the start and the end address of the used memory block instead of keeping a list of used and free memory blocks. This also ensures that newly arriving DUs do not need to be split into several memory locations because used and free memory are continuous blocks.

The following describes an embodiment based on the actual current HRD definition as used by HEVC extension where the timing information for interleaving is provided through an additional DU level SEI message as presented earlier. The described embodiment allows for DUs that are send in an order interleaved across layers to be removed DU wise from the CPB in interleaved fashion, consecutively or AU wise.

In the single CPB solution, the CPB removal time in Annex C in [1] should be extended as follows (marked by underline):

"Multiple tests may be needed for checking the conformance of a bitstream, which is referred to as the bitstream under test. For each test, the following steps apply in the order listed:

For each access unit in BitstreamToDecode starting from access unit 0, the buffering period SEI message (present in BitstreamToDecode or available through external means not specified in this Specification) that is associated with the access unit and applies to TargetOp is selected, the picture timing SEI message (present in BitstreamToDecode or available through external means not specified in this Specification) that is associated with the access unit and applies to TargetOp is selected, and when SubPicHrdFlag is equal to 1 and sub_pic cpbparams_in_pic_timing_sei_flag is equal to 0, the decoding unit information SEI messages (present in BitstreamToDecode or available through external means not specified in this Specification) that are associated with decoding units in the access unit and apply to TargetOp are selected, and when sub_pic_interleaved_hrd_params_present_flag is equal to 1 the decoding unit interleaving information SEI message (present in BitstreamToDecode or available through external means not specified in this Specification) that are associated with decoding units in the access unit and apply to TargetOp are selected.

When sub_pic_interleaved_hrd_params_present_flag in the selected syntax structure is equal to 1, the CPB is scheduled to operate either at the AU level (in which case the variable SubPicInterleavedHrdFlag is set equal to 0) or at interleraved DU level (in which case the variable SubPicInterleavedHrdFlag is set equal to 1).

The variable SubPicInterleavedHrdPreferredFlag is either specified by external means, or when not specified by external means, set equal to 0.

When the value of the variable SubPicInterleavedHrdFlag has not been set by step 9 above in this subclause, it is derived as follows:

SubPicInterleavedHrdFlag=SubPicHrdPreferredFlag && SubPicInterleavedHrdPreferredFlag && sub_pic_interleaved_hrd_params_present_flag If SubPicHrdFlag and SubPicInterleavedHrdFlag are equal to 0, the HRD operates at access unit level and each decoding unit is an access unit. Otherwise the HRD operates at sub-picture level and each decoding unit is a subset of an access unit.

For each bitstream conformance test, the operation of the CPB is specified in subclause C.2, the instantaneous decoder operation is specified in clauses 2 through 10, the operation of the DPB is specified in subclause C.3, and the output cropping is specified in subclause C.3.3 and subclause C.5.2.2.

HSS and HRD information concerning the number of enumerated delivery schedules and their associated bit rates and buffer sizes is specified in subclauses E.1.2 and E.2.2. The HRD is initialized as specified by the buffering period SEI message specified in subclauses D.2.2 and D.3.2. The removal timing of decoding units from the CPB and output timing of decoded pictures from the DPB is specified using information in picture timing SEI messages (specified in subclauses D.2.3 and D.3.3), in decoding unit information SEI messages (specified in subclauses D.2.21 and D.3.21) or in decoding unit interleaving information SEI messages (specified in subclauses D.2.XX and D.3.XX). All timing information relating to a specific decoding unit shall arrive prior to the CPB removal time of the decoding unit.

When SubPicHrdFlag is equal to 1, the following applies:
The variable duCpbRemovalDelayInc is derived as follows:
  If SubPicInterleavedHrdFlag is equal to 1, duCpbRemovalDelayInc is set equal to the value of du_spt_cpb_interleaved_removal_delay_increment in the decoding unit interleaving information SEI message, selected as specified in subclause C.1, associated with decoding unit m.
  Otherwise, if sub_pic_cpb_params_in_pic_timing_sei_flag is equal to 0 and sub_pic_interleaved_hrd_params_present_flag is equal to 0, duCpbRemovalDelayInc is set equal to the value of du_spt_cpb_removal_delay_increment in the decoding unit information SEI message, selected as specified in subclause C.1, associated with decoding unit m.
  Otherwise, if sub_pic_cpb_params_in_pic_timing_sei_flag is equal to 0 and sub_pic_interleaved_hrd_params_present_flag is equal to 1, duCpbRemovalDelayInc is set equal to the value of du_spt_cpb_removal_delay_increment in the decoding unit information SEI message and duCpbRemovalDelayIncInterleaved is set equal to the value of du_spt_cpb_interleaved_removal_delay_increment in the decoding unit interleaving information SEI message, selected as specified in subclause C.1, associated with decoding unit m.
  Otherwise, if du_common_cpb_removal_delay_flag is equal to 0 and sub_pic_interleaved_hrd_params_present_flag is equal to 0, duCpbRemovalDelayInc is set equal to the value of du_cpb_removal_delay_increment_minus1[i]+1 for decoding unit m in the picture timing SEI message, selected as specified in subclause C.1, associated with access unit n, where the value of i is 0 for the first num_nalus_in_du_minus1[0]+1 consecutive NAL units in the access unit that contains decoding unit m, 1 for the subsequent num_nalus_in_du_minus1[1]+1 NAL units in the same access unit, 2 for the subsequent num_nalus_in_du_minus1[2]+1 NAL units in the same access unit, etc.

determines which DU operation mode is used: either the interleaved operation mode or the non-interleaved operation mode and DUNominalRemovalTime[m] is the removal time of a DU for the selected operation mode.

Additionally the earliest arrival time of DUs is different as currently defined when sub_pic_interleaved_hrd_params_present_flag is equal to 1, irrespective of the operation mode. The earliest arrival time is then derived as follows:

```
if(!SubPicInterleavedHrdFlag&&
sub_pic_interleaved_hrd_params_present_flag)
    DuNominalRemovalTimeNonInterleaved[  m  ]                    =
AuNominalRemovalTime( n )                                        −
    ClockSubTick * duCpbRemovalDelayIncInterleaved             if(
!subPicParamsFlag                                                )
    tmpNominalRemovalTime   =   AuNominalRemovalTime[ m ]     (C-6)
else         if(!sub_pic_interleaved_hrd_params_present_flag    ||
SubPicInterleavedHrdFlag)
    tmpNominalRemovalTime = DuNominalRemovalTime[ m ]
else
    tmpNominalRemovalTime                                       =
DuNominalRemovalTimeNonInterleaved[ m ]"
```

Otherwise, if du_common_cpb_removal_delay_flag is equal to 0 and sub_pic_interleaved_hrd_params_present_flag is equal to 1, duCpbRemovalDelayInc is set equal to the value of du_cpb_removal_delay_increment_minus1[i]+1 for decoding unit m in the picture timing SEI message and duCpbRemovalDelayIncInterleaved is set equal to the value of du_spt_cpb_interleaved_removal_delay_increment in the decoding unit interleaving information SEI message, selected as specified in subclause C.1, associated with access unit n, where the value of i is 0 for the first num_nalus_in_du_minus1[0]+1 consecutive NAL units in the access unit that contains decoding unit m, 1 for the subsequent num_nalus_in_du_minus1[1]+1 NAL units in the same access unit, 2 for the subsequent num_nalus_in_du_minus1[2]+1 NAL units in the same access unit, etc.

Otherwise, duCpbRemovalDelayInc is set equal to the value of du_common_cpb_removal_delay_increment_minus1+1 in the picture timing SEI message, selected as specified in subclause C.1, associated with access unit n.

The nominal removal time of decoding unit m from the CPB is specified as follows, where AuNominalRemovalTime[n] is the nominal removal time of access unit n:

If decoding unit m is the last decoding unit in access unit n, the nominal removal time of decoding unit m DuNominalRemovalTime[m] is set equal to AuNominalRemovalTime[n].

Otherwise (decoding unit m is not the last decoding unit in access unit n), the nominal removal time of decoding unit m DuNominalRemovalTime[m] is derived as follows:

if(sub_pic_cpb_params_in_pic_timing_sei_flag && !SubPicInterleavedHrdFlag) DuNominalRemovalTime[m]=DuNominalRemovalTime[m+1]−ClockSubTick*duCpbRemovalDelayInc (C-13)
else
    DuNominalRemovalTime[m]=AuNominalRemovalTime(n) −ClockSubTick*duCpbRemovalDelayInc where SubPicInterleavedHrdFlag With respect to the above embodiment, it is noteworthy that the operation of the CPB accounts for arrival times of data packets into the CPB in addition to the explicitly signaled removal times of data packets. Such arrival times impact the behavior of intermediate devices that constitute buffers along the data packet transport chain, e.g. the elementary stream buffer in the receiver of an MPEG-2 Transport Stream, for which the elementary stream buffer acts as the CPB of the decoder. The HRD model that the above embodiment is based on derives the initial arrival time based on the variable tmpNominalRemovalTime, thereby taking into account either the removal times for DUs in case of the interleaved DU operation or an equivalent removal time "DuNominalRemovalTimeNonlnterleaved" for consecutive DU operation mode (as if the data would be removed in an interleaved manner from the CPB) for calculation of the correct initial arrival time of data packets into the CPB (see C-6).

A further embodiment is the layer-wise re-ordering of DUs for the AU based decoding operation. When a single CPB operation is used and the data has been received in an interleaved fashion, the decoder may want to operate on an AU basis. In such a case, the data read from the CPB, which corresponds to several layers, is interleaved and would be sent at once to the decoder. When the AU base decoding operation is carried out, the AU is re-ordered/re-arranged in such a way that all DUs from layer m precede DUs from layer m+1 before being sent for decoding, so that the reference layer is decoded before the enhancement layer that references it.

1. Multi CPB Operation

Alternatively a decoder is described that uses one coded picture buffer for the DUs of each layer.

Figure 15:
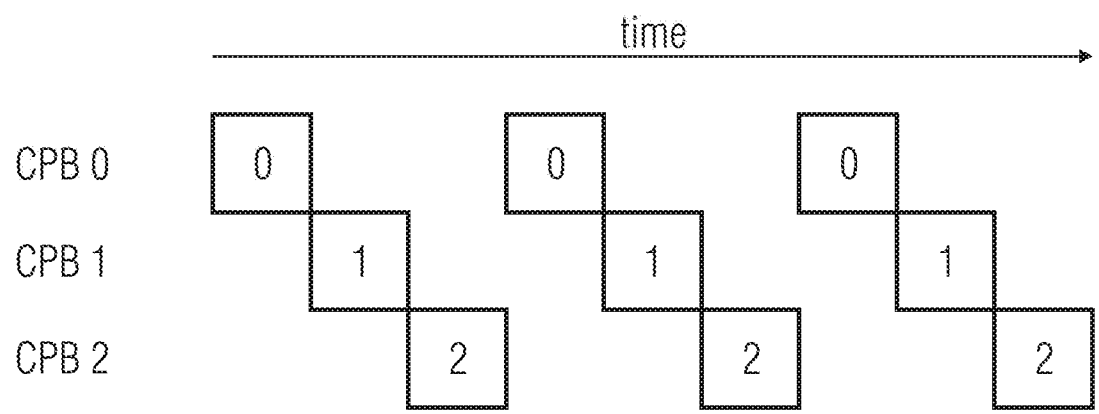
FIG. 15 shows a schematic diagram illustrating the distribution of multi-layer DUs to multiple CPBs in accordance with an embodiment.

FIG. 15 shows the assignment of DUs to different CPBs. For each layer (number in the box), an own CPB is operated and DUs are stored into different memory locations for each CPB. Exemplarily the arrival timing of an interleaved bitstream is shown. The assignment works in the same way for non-interleaved bitstreams based on the layer identifier.

FIG. 16 shows the memory usage in the different CPBs. DUs of the same layer are stored in consecutive memory locations.

A multi-layer decoder can take advantage of such a memory layout because the DUs belonging to the same layer can be accessed at consecutive memory addresses. DUs arrive in decoding order for each layer. The removal of DUs of a different layer cannot create any "holes" in the used CPB memory area. The used memory block covers a continuous block in each CPB. The multiple CPB concept also has advantages for bitstreams that are split layer-wise at the transport layer. If different layers are transmitted using different channels the multiplexing of DUs into a single bitstream can be avoided. Thus the multi-layer video decoder does not have to implement this extra step and implementation cost can be reduced.

In the case where the multi CPB operation is used, in addition to the timing described for the single CPB case that still applies, the following applies:

A further aspect is the re-arrangement of DUs from multiple CPB when these DUs share the same CPB removal time (DuNominalRemovalTime[m]). In both the interleaved operation mode and non-interleaved operation mode for DU removal, it may happen that DUs from different layers and therefore different CPBs share the same CPB removal time. In such a case the DUs are ordered in increasing number of LayerId before being sent to the decoder.

The embodiments set out above and in the following also describe a mechanism to synchronize multiple CPBs. In the current text [1], the reference time or anchor time is described as the initial arrival time of the first decoding unit entering the (unique) CPB. For the multi CPB case, there is a master CPB and multiple slave CPBs, which leads to a dependency between multiple CPB. A mechanism for the master CPB to synchronize with the slave CPB is described, too. This mechanism is advantageous so that the CPBs receiving DUs remove those DUs at the proper time, i.e. using the same time reference. More concretely, the first DU initializing the HRD synchronizes with the other CPBs and the anchor time is set equal to the initial arrival time of the DU for the mentioned CPB. In a specific embodiment, the master CPB is the CPB for the base layer DUs, while it may be possible that the master CPB corresponds to a CPB receiving enhancement layer data if random access points for enhancement layers are allowed that initialize the HRD.

Thus, in accordance with the thoughts outlined above subsequent to FIGS. 7 to 10, the comparison embodiments of these figures are modified in a manner outlined hereinafter with respect to the following figures. The encoder of FIG. 17 operates similar to the one discussed above with respect to FIG. 10. Signaling 724 is, however, optional. Accordingly, the above description shall, in so far, also apply to the following embodiments, and a similar statement shall be true for the subsequently explained decoder embodiments.

Figure 17:
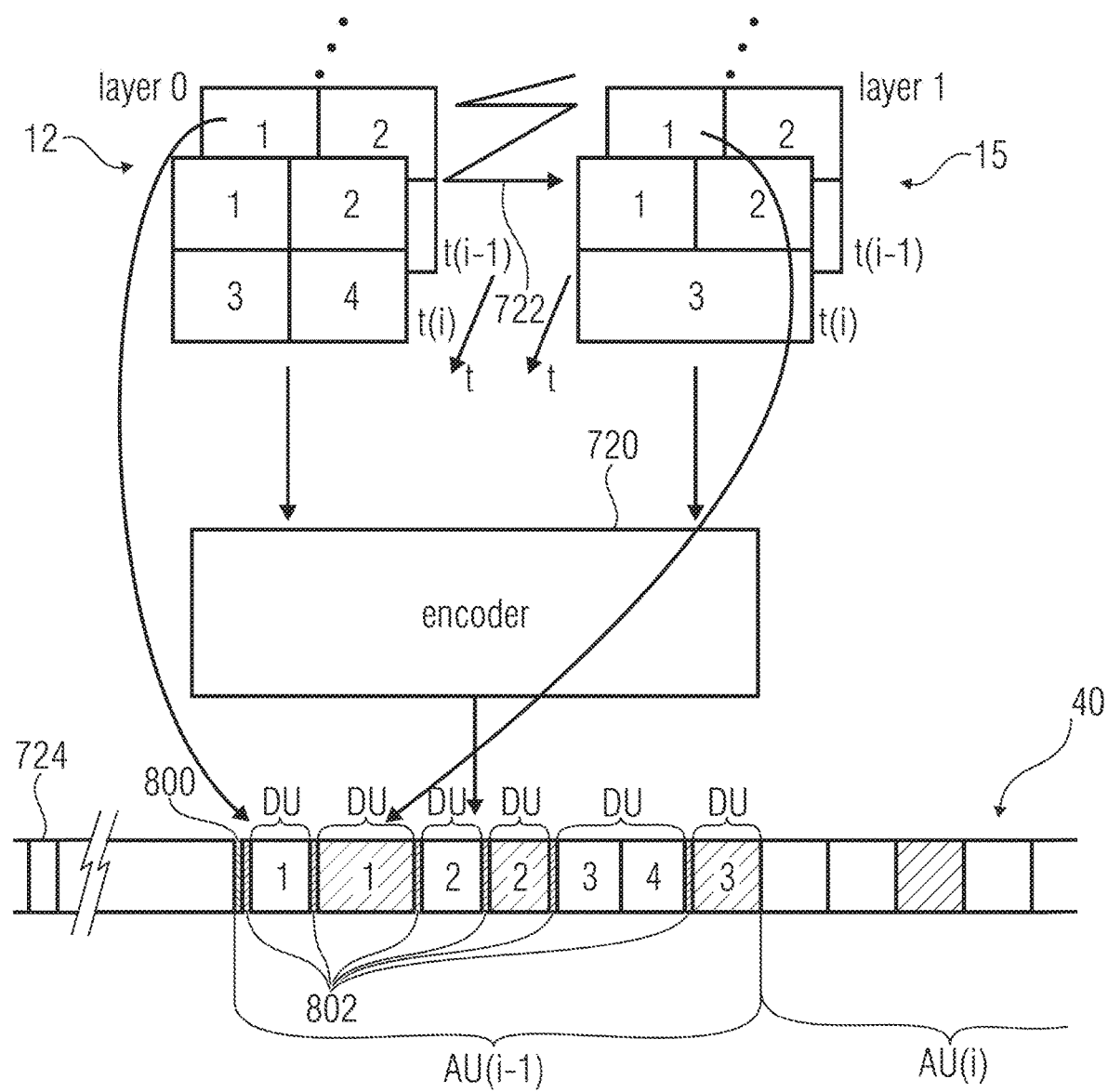
FIGS. 17 to 20 show schematic diagrams of a multi-layered video data stream along with an encoder modified relative to FIG. 7 so as to correspond to an embodiment of the present application.

In particular, the encoder 720 of FIG. 17 encodes video content here exemplarily including video of layers 12 and 15 into a multi-layered video data stream 40 so that same has, for each of the plurality of layers 12 and 15, the video content encoded therein in units of sub-portions of pictures of the video content using inter-layer prediction. In the example, sub-portions are denoted 1 to 4 for layer 0 and 1-3 for layer 1 Each sub-portion is respectively encoded into one or more payload packets of a sequence of packets of the video data stream 40, each packet being associated with one of the plurality of layers, the sequence of packets being divided into a sequence of access units AU so that each access unit collects the payload packets relating to a common time instant. Two AUs are exemplarily shown, one for time instant i−1 and the other for i. The access units AU are subdivided into decoding units DU so that each access unit is subdivided into two or more decoding units, with each decoding unit solely comprising payload packets associated with one of the plurality of layers, wherein the decoding units comprising packets associated with different layers are interleaved with each other. Frankly speaking, the encoder 720 controls the interleaving of the decoding units within the access units so as to decrease—or keep as low as possible— an end-to-end delay by traversing and encoding the common time instant in a layer-first-and-sub-portions-later traversal order. So far, the encoder's mode of operation had already been presented above with respect to FIG. 10.

However, the encoder of FIG. 17 does provide each access unit AU with two times of timing control information: a first timing control information 800 signals a decoder buffer retrieval time for the respective access unit AU as a whole, and a second timing control information 802 signals, for each decoding unit DU of the access unit AU, a decoder buffer retrieval time corresponding to their sequential order in the multi-layer video data stream.

As illustrated in FIG. 17, encoder 720 may spread the second timing information 802 onto several timing control packets each of which precedes an decoding unit DU the respective timing control packet is associated with, and indicates the second decoder retrieval buffer time for the decoding unit DU the respective timing control packet precedes. FIG. 12c indicates an example for such a timing control packet. As can be seen a timing control packet may form the begin of the associated decoding unit and indicate an index associated with the respective DU, i.e. decoding_unit_idx, and the decoder retrieval buffer time for the respective DU, i.e. du_spt_cpb_removal_delay_interleaved_increment which indicates the retrieval time or DPB removal time in predetermined temporal units (increments). Accordingly, the second timing information 802 may be output by encoder 720 during the encoding of the layers of the current time instant. To this end, the encoder 720 reacts, during the encoding, to spatial complexity variations in the pictures 12 and 15 of the various layers.

The encoder 720 may estimate the decoder buffer retrieval time for a respective access unit AU, i.e. the first timing control information 800, in advance of encoding the layers of the current time instant and place the first timing control information 800 at the beginning of the respective AU, or—if allowed according to the standard—at the end of the AU.

Additionally or alternatively to the provision of timing control information 800, encoder 720 may, as shown in FIG. 18 provide each access unit with a third timing control information 804 which signals, for each decoding unit of the respective access unit, a third decoder buffer retrieval time so that, in accordance with the third decoder buffer retrieval time for the respective access unit's decoding units DU, the decoding units DU in the respective access unit AU are ordered in accordance with a layer order defined among the plurality of layers so that no decoding unit comprising packets associated with a first layer follows any decoding unit in the respective access unit, comprising packets associated with a second layer succeeding the first layer in accordance with the layer order. That is, according to the third timing control information's 804 buffer retrieval times, the DUs shown in FIG. 18 are at the decoding side resorted so that the DUs of picture's 12 portions 1; 2; 3 and 4, precede the DUs of picture's 15 portions 1; 2 and 3. The encoder 720 may estimate the decoder buffer retrieval times according to the third timing control information 804 for the DUs in advance of encoding the layers of the current time instant and place the first timing control information 802 at the beginning of the respective AU. This possibility is depicted in FIG. 8 exemplarily in FIG. 12a. FIG. 12a, shows that ldu_spt_cpb_removal_delay_interleaved_increment_minus1 is sent for each DU and for each layer. Although it might be that the number of decoding units per layer may be restricted to be equal for all layers, i.e. one_num_layer_decoding_units_minus1 is used, as illustrated in FIG. 12a, an alternative to FIG. 12a may be that the number of decoding units per layer may individually be set for each layer. In the latter case, the syntax element num_layer_decoding_units_minus1 could be read for each layer, in which case the reading would be displaced from the position shown in FIG. 12a to be, for example, between the two for-next loops in FIG. 12a, so that num_layer_decoding_units_minus1 would be read for each layer within the for next loop using counter variable j. If allowed according to the standard, encoder 720 may alternatively place timing control information 804 at the end of the AU. Even alternatively, the encoder 720 may place the third timing control information at each DUs beginning, just as the second timing control information. This is shown in FIG. 12b. FIG. 12b indicates an example for a timing control packet placed at the beginning of each DU (in their interleaved state). As can be seen a timing control packet carrying timing control information 804 for a certain DU, may be placed at the begin of the associated decoding unit and indicate an index associated with the respective DU, i.e. layer_decoding_unit_idx, which is layer specific, i.e. all DUs belong to the same layer are attributed to the same layer DU index. Further, the decoder retrieval buffer time for the respective DU, i.e. ldu_spt_cpb_removal_delay_interleaved_increment which indicates the retrieval time or DPB removal time in predetermined temporal units (increments) is signaled in such packet. According to these timings, the DUs are resorted to obey the layer order, i.e. layer 0's DUs is removed from DPB first with then layer 1's DUs and so forth. Accordingly, the timing control information 808 may be output by encoder 720 during the encoding of the layers of the current time instant.

As has been described, information 802 and 804 may be present in the data stream concurrently. This is illustrated in FIG. 19.

Figure 20:
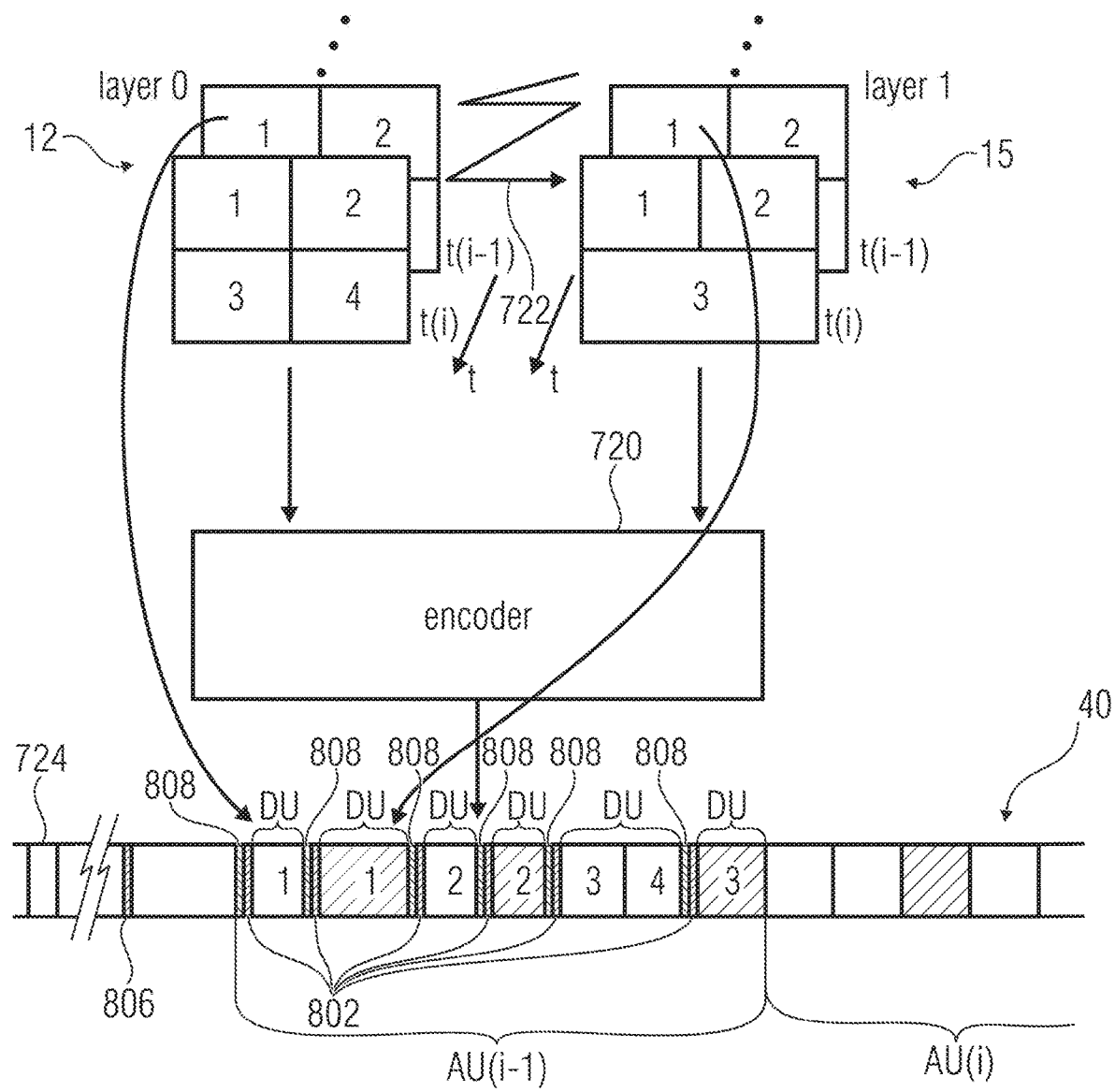

Finally, as illustrated in FIG. 20, a decoding unit interleaving flag 808 may be inserted into the data stream by encoder 720 so as to signal whether a timing control information 808 sent in addition to timing control information 800 acts as timing control information 802 or 804. That is, if encoder 720 decided to interleave DUs of different layers as depicted in FIG. 20 (and FIGS. 17 to 19), then decoding unit interleaving flag 808 is set to indicate that information 808 equals information 802 and the above description of FIG. 17 applies with respect to the remainder of the functionality of the encoder of FIG. 20. If, however, encoder does not interleave packets of different layers within the access unit, as depicted in FIG. 13, then decoding unit interleaving flag 808 is set by encoder 720 to indicate that information 808 equals information 804 with the difference to the description of FIG. 18 with respect to the generation of 804 being that the encoder then does not have to estimate the timing control information 804 in addition to information 802, but may determine the timing control information's 804 buffer retrieval times on the fly with reacting on layer specific coding complexity variations among the sequence of layers on the fly during encoding the access unit in a manner similar to the procedure of generating the timing control information 802.

FIGS. 21, 22, 23 and 24 show the data stream of FIGS. 17, 18, 19, and 20, respectively, as entering a decoder 700. If the decoder 700 is configured as the one explained above with respect to FIG. 9, then decoder 700 may decode the data stream in the same manner as described above with respect to FIG. 9 using timing control information 802. That is, encoder and decoder contribute both to a minimum delay. In case of FIG. 24, where decoder receives the stream of FIG. 20, this is obviously merely possible in case of DU interleaving having been used and being indicated by flag 806.

Figure 21:
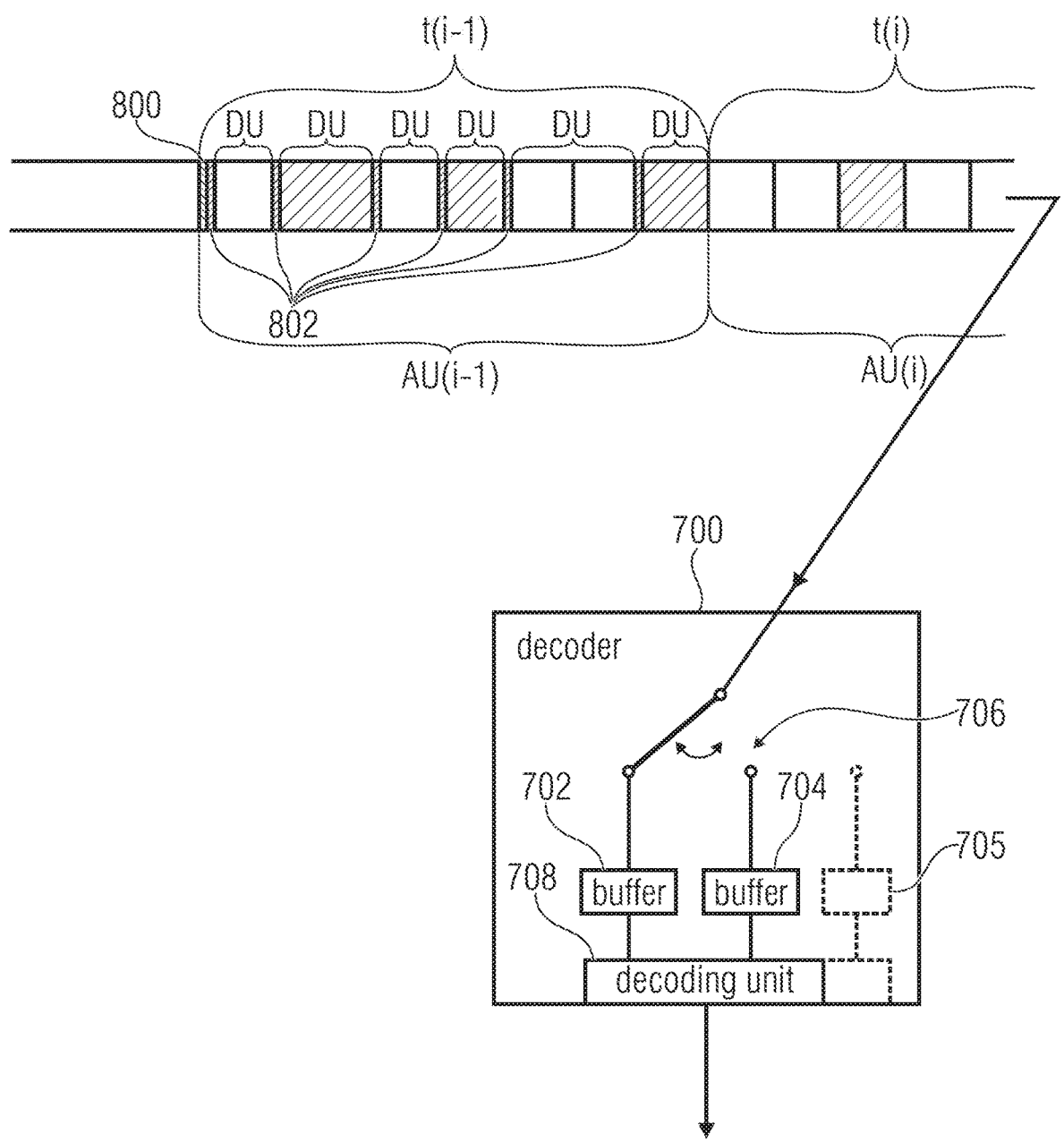
FIGS. 21 to 24 show schematic diagrams of a multi-layered video data stream along with a decoder modified relative the one exemplarily shown in FIG. 9 so as to correspond to an embodiment of the present application.
Figure 23:
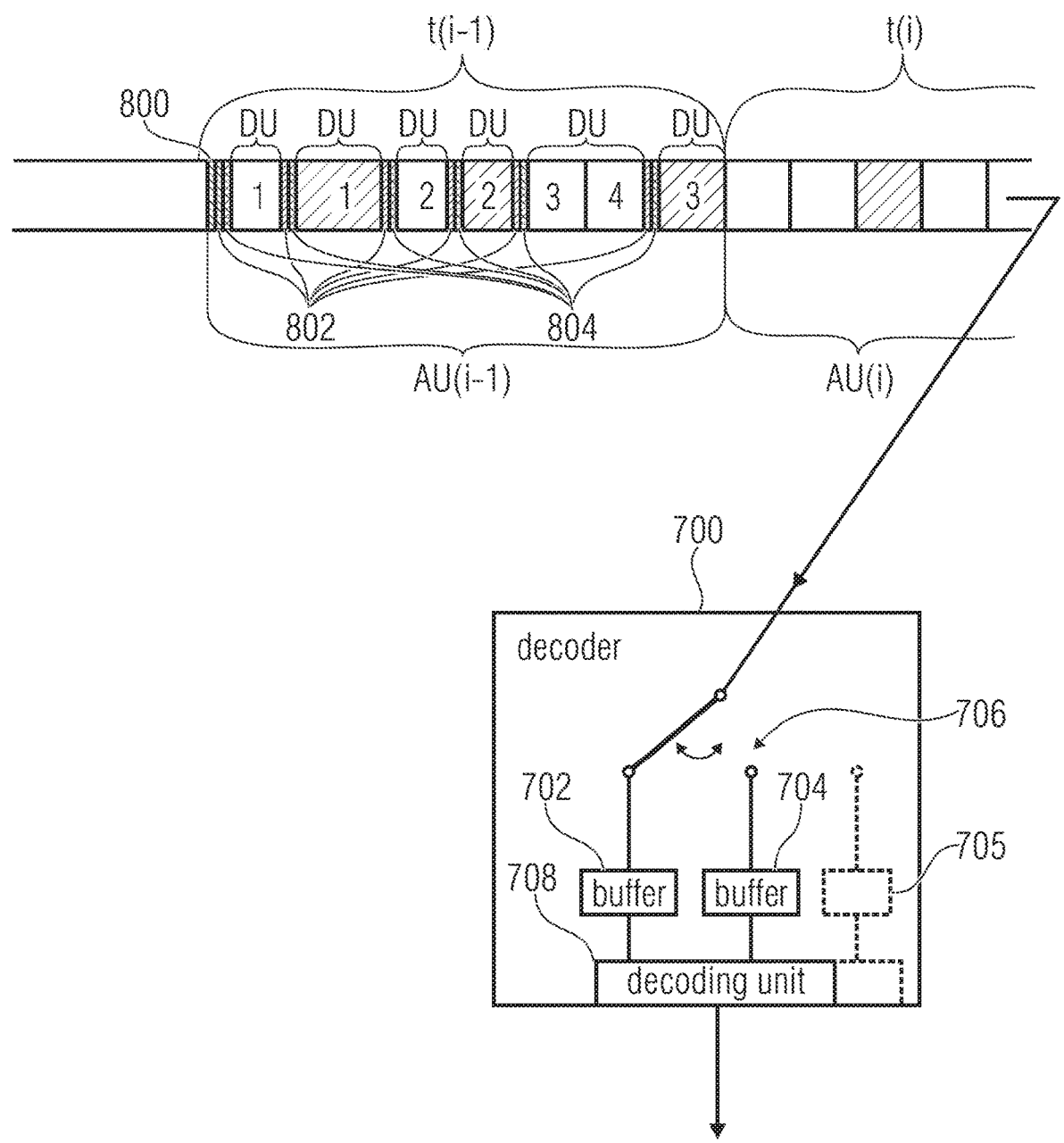
Figure 24:
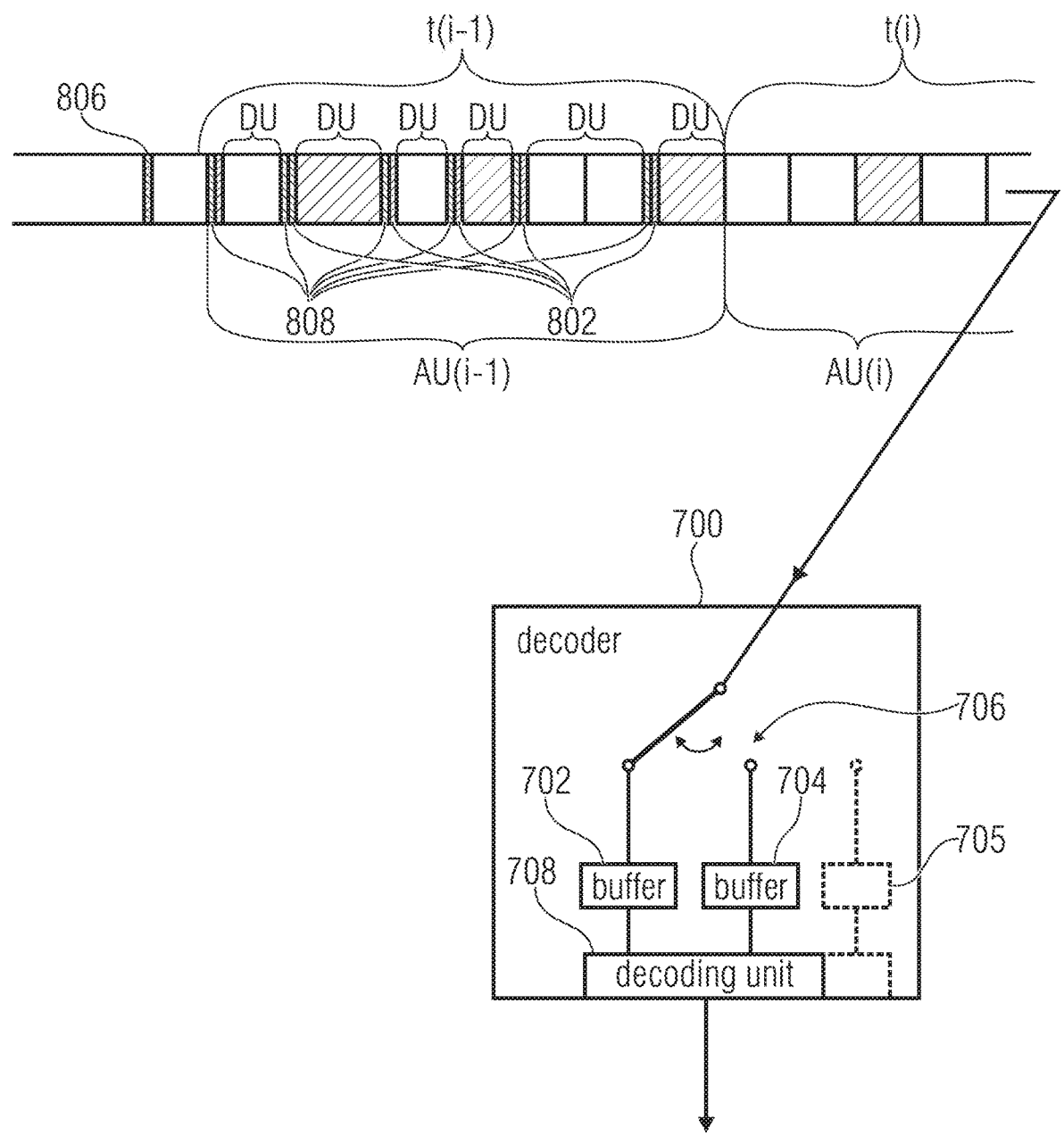

For whatever reason, the decoder may, however, in case of FIGS. 21, 23 and 24 decode the multi-layered video data stream with emptying the decoder's buffer for buffering the multi-layered data stream in units of access units using the first timing control information 800 and irrespective of the second timing control information 802. For example, the decoder may not be able to perform parallel processing. The decoder may not have more than one buffer, for example. The delay increases at both encoder and decoder side compared to the case of exploiting the layer-interleaved order of the DUs according to the timing control information 802, since the decoder's buffer is operated at complete AUs rather than on DU level.

As already discussed above, the decoder of FIGS. 21 to 24 does not have to have two buffers. One buffer, such as 702, may suffice, especially if the timing control information 802 is not exploited, but rather any of the fallback positions in form of timing control information 800 and 804 is used. On the other hand, if the decoder's buffer is composed of one partial buffer for each layer, this helps when exploiting timing control information 802 since the decoder is may, for each layer, buffer the decoding units comprising packets associated with the respective layer in the partial buffer for the respective layer. With 705, the possibility of having more than two buffers is illustrated. The decoder may empty decoding units from different partial buffers to decoder entities of different codecs. Alternatively, the decoder uses a smaller number of partial buffers than compared to the number of layers, namely each partial buffer for a subset of the layers with forwarding DUs of a certain layer to that partial buffer associated with the set of layers to which the layer of the respective DU belongs. One partial buffer such as 702 may synchronize the other partial buffers such as 704 and 705.

Figure 22:
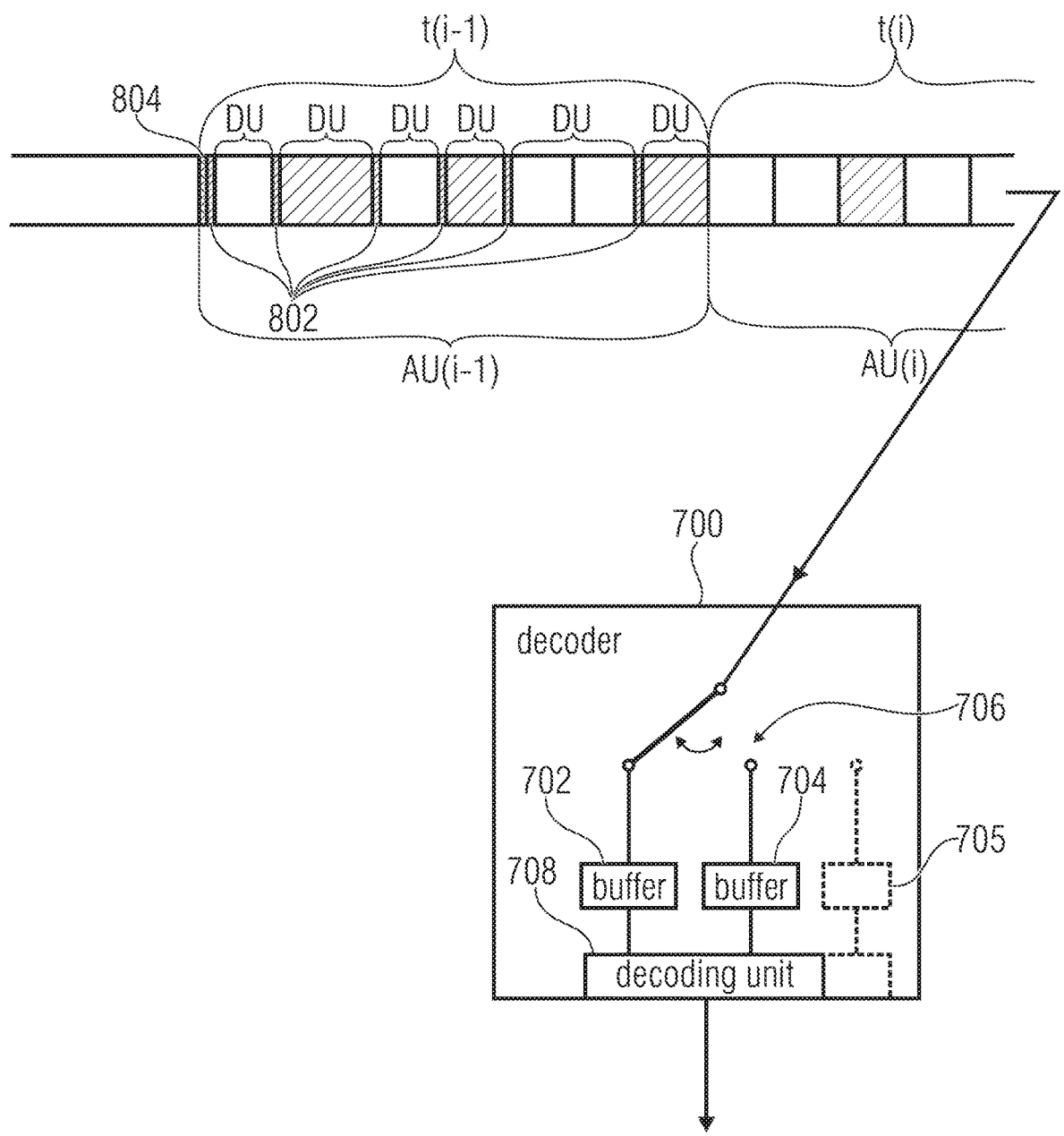

For whatever reason, the decoder may, however, in case of FIGS. 22 and 23 decode the multi-layered video data stream with emptying the decoder's buffer controlled via timing control information 804, namely by removing the access units' decoding units, by de-interleaving, in accordance with the layer order. By this measure, the decoder effectively recombines—guided via the timing control information 804—the decoding units associated with the same layer and belonging to the access unit and reorders them following a specific rule such as DU of layer n before DU of layer n+1.

As is illustrated in FIG. 24, a decoding unit interleaving flag 806 in the data stream may signal whether a timing control information 808 acts as timing control information 802 or 804. In that case, the decoder receiving the data stream may be configured to be responsive to the decoding unit interleaving flag 806, so as to, if the information 806 is second timing control information á la 802, empty the decoder's buffer for buffering the multi-layered data stream in units of access units using the first timing control information 800 and irrespective of information 806, and if the information is timing control information á la 804, empty the decoder's buffer for buffering the multi-layered data stream in units of the decoding units using the information 806: that is, in that case the DU were not interleaved s that using timing control information 808 an ordered DU operation with an end-to-end delay laying between the one otherwise achievable by using 802, and the maximum delay achievable by timing control information 800 would result.

Whenever the timing control information 800 is used a fallback position, i.e. the decoder choses emptying the decoder's buffer in units of access units, the decoder may remove the access units' decoding units from the buffer 702—or even fill the buffer 702 with the DUs—in an de-interleaving manner so that they from an AU having the DUs order in accordance with the layer order. That is, the decoder may recombine the decoding units associated with the same layer and belonging to the access unit and reorders them following a specific rule such as DU of layer n before DU of layer n+1, before the whole AU is then removed from the buffer for being decoded. This deinterleaving is not necessary in case of the decoding unit interleaving flag 806 of FIG. 24 indicating the deinterleaved transmission has already been used and timing control information 808 acts like timing control information 804.

Although not specifically discussed above, the second timing control information 802 may be defined as an offset to the first timing control information 800.

Figure 25:
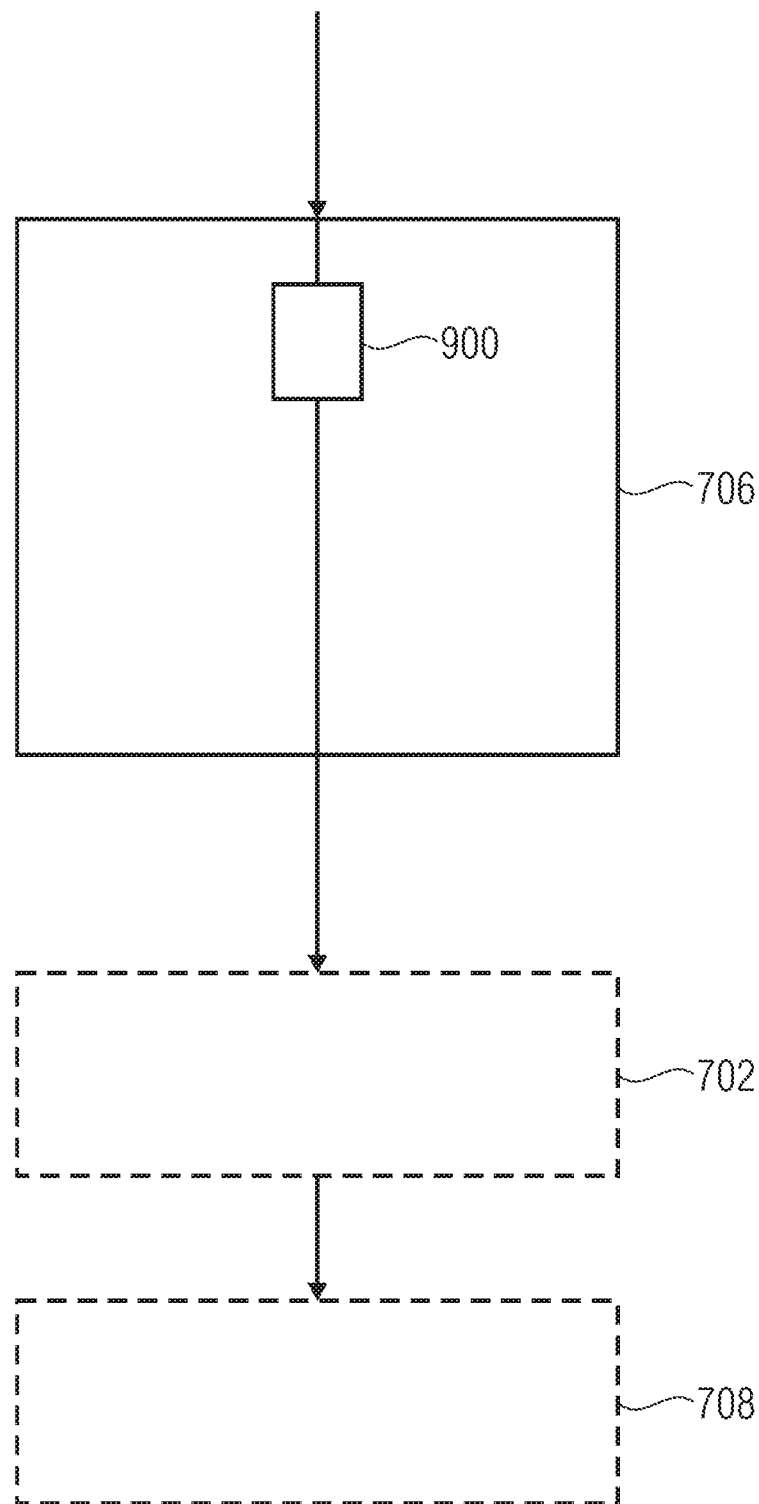
FIG. 25 shows a block diagram illustrating an intermediate network device positioned upstream from the decoder buffer.

The multiplexer 706 shown in FIGS. 21 to 24 acts as an intermediate network device configured to forward the multi-layered video data stream to the coded picture buffer of a decoder. The intermediate network device may, in accordance with an embodiment, be configured to receive an information qualifying the decoder as being able to handle the second timing control information, if the decoder is able to handle the second timing control information 802, derive earliest-arrival times for scheduling the forwarding, from timing control information 802 and 800 in accordance with a first computation rule, namely according to DuNominal-RemovalTime; and if the decoder is not able to handle the second timing control information 802, derive earliest-arrival times for scheduling the forwarding, from the timing control information 802 and 800 in accordance with a second computation rule, namely according to DuNominal-RemovalTimeNonInterleaved. In order to explain the just outlined issue in more detail, reference is made to FIG. 25 which shows an intermediate network device, also indicated using reference sign 706, arranged between an inbound multi-layered video data stream and an output leading to the decoding buffer generally indicated using reference sign 702, but as already outlined above, the decoding buffer may be a composition of several partial buffers. As is shown in FIG. 25, internally the intermediate network device 706 comprises a buffer 900 for buffering inbound DUs and then forwarding them to the decoder buffer 702. The above embodiments concerned the decoding buffer removal times of the inbound DUs, i.e. the times when these DUs have to be forwarded from the decoding buffer 702 to the decoding unit 708 of the decoder. The storage capacity of decoder buffer 702 is, however, as far as the guaranteed amount of which is concerned, limited so that in addition to the removal times, i.e. the time at which the DUs buffered in buffer 702 are to be removed, the earliest arrival times should be managed as well. This is the aim of the "earliest-arrival times" mentioned before, and in accordance with embodiments outlined herein, the intermediate network device 706 is configured to compute these earliest-arrival times on the basis of the obtained timing control information according to different computation rules, choosing the computation rule according to an information on the decoder's ability to operate on the inbound DUs in their interleaved format, i.e. depending on whether the decoder is able to operate on the same in the interleaved manner or not. In principle, the intermediate network device 706 could determine the earliest-arrival time on the basis of the DU removal times of timing control information 802 by providing a fixed temporal offset between the earliest arrival time and the removal time for each DU in case of the decoder being able to decode the inbound data stream using the DU interleaved concept, wherein the intermediate network device 706 likewise provides a fixed temporal offset between the AU removal times as indicated by the timing control information 800 in order to derive the earliest arrival times of the access units in case of the decoder advantageously handling the inbound data stream access unit wise, i.e. choosing the first timing control information 800. Instead of using a constant temporal offset, the intermediate network device 706 could also take the size of the individual DUs and AUs into account.

The issue of FIG. 25 shall also be used as an occasion to indicate a possible modification of the embodiments described so far. In particular, the embodiments discussed so far treated the timing control information 800, 802 and 804 as signaling the "decoder buffer retrieval times" for the decoding units and access units, respectively, by directly signaling the "removal times" i.e. the times at which the respective DUs and AUs, respectively, have to be forwarded from buffer 702 to decoding unit 708. However, as became clear from the discussion of FIG. 25, arrival times and retrieval times are interrelated to each other via the size of the decoder buffer 702, such as the guaranteed minimum size thereof, and the size of the individual DUs in case of timing control information 802 and 804, and the size of the access units in case of timing control information 800, respectively, on the other hand. Accordingly, all of the above outlined embodiments shall be interpreted such that the "decoder buffer retrieval times" signaled by the "timing control information" 800, 802 and 804, respectively, includes both alternatives, an explicit signalization by way of earliest arrival times or buffer removal times. All of the above discussion directly translates from the description brought forward above using the explicit signalization of buffer removal times as decoder buffer retrieval times onto alternative embodiments where earliest arrival times are used as the decoder buffer retrieval times: the interleaved transmitted DUs would be re-sorted in accordance with the timing control information 804. The only difference: the re-sorting or deinterleaving would take place upstream, i.e. in front of, buffer 702 rather than downstream thereof, i.e. between buffer 702 and decoding unit 708. In case of the intermediate network device 706 computing earliest arrival times from the inbound timing control information, the intermediate network device 706 would use these earliest arrival times in order to instruct a network entity positioned upstream relative to intermediate network device 706, such as the encoder itself or some intermediate network entity, to obey these earliest arrival times in feeding buffer 900, and in the alternative case of deriving buffer removal times from the inbound timing control information—which then uses explicit signaling of earliest arrival times—the intermediate network device 706 activates removals of DUs or, in the alternative case, access units from buffer 900 in accordance with the derived removal times.

Summarizing the just outlined alternative of the above outlined embodiments, this means that the usage of the timing control information in order to empty the decoder buffer may take place by directly or indirectly using the timing control information: if the timing control information is embodied as a direct signalization of decoder buffer removal times, then the emptying of the buffer may take place directly scheduled according to these decoder buffer removal times, and in case of embodying the timing control information using decoder buffer arrival times, then a re-computation may take place in order to deduce from these decoder buffer arrival times the decoder buffer removal times according to which the removal of DUs or AUs takes place.

As a note common to the above description of various embodiments and figures illustrating an "interleaved packet" transmission, it is submitted that the "interleaving" not necessarily includes a merging of the packets belong to DU's of different layers onto a common channel. Rather, the transmission may take place completely in parallel in separate channels (separate logical or physical channels): the packets of different layers, thus forming different DUs, are output by the encoder in parallel, with the output times being interleaved as discussed above, and in addition to the DUs, the above-mentioned time control information is sent to the decoder. Among this timing control information, timing control information 800 indicates as to when a the DUs forming a complete AU have to be forwarded from the decoder's buffer to the decoder, the timing control information 802 indicates for each DU individually as to when the respective DU has to be forwarded from the decoder's buffer to the decoder, these retrieval times corresponding to the order of the DU's output times at the encoder, and the timing control information 804 indicates for each DU individually as to when the respective DU has to be forwarded from the decoder's buffer to the decoder, these retrieval times deviating from the order of the DU's output times at the encoder and leading to the resorting: instead of being forwarded from the decoder's buffer to the decoder in the interleaved order of their outputting, the DUs of layer i are forwarded prior to the DUs of layer i+1 for all layers. As described, the DUs may be distributed onto separate buffer partitions, according to layer association. The multi-layered video data stream of FIG. 19-23 may conform to AVC or HEVC or any extension thereof, but this is not to be seen as excluding other possibilities.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded video signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable. Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] B. Bross, W.-J. Han, J.-R. Ohm, G. J. Sullivan, T. Wiegand (Eds.), "High Efficiency Video Coding (HEVC) text specification draft 10", JCTVC-L1003, Geneva, CH, January 2013
[2] G. Tech, K. Wegner, Y. Chen, M. Hannuksela, J. Boyce (Eds.), "MV-HEVC Draft Text 3 (ISO/IEC 23008-2 PDAM2)", JCT3V-C1004, Geneva, CH, January 2013
[3] G. Tech, K. Wegner, Y. Chen, S. Yea (Eds.), "3D-HEVC Test Model Description, draft specification", JCT3V-C1005, Geneva, CH, January 2013
[4] WILBURN, Bennett, et al. High performance imaging using large camera arrays. ACM Transactions on Graphics, 2005, 24. Jg., Nr. 3, S. 765-776.
[5] WILBURN, Bennett S., et al. Light field video camera. In: Electronic Imaging 2002. International Society for Optics and Photonics, 2001. S. 29-36.
[6] HORIMAI, Hideyoshi, et al. Full-color 3D display system with 360 degree horizontal viewing angle. In: Proc. Int. Symposium of 3D and Contents. 2010. S. 7-10.

The invention claimed is:

1. A decoder comprising a processor configured to decode a multi-layered video data stream that includes, for a plurality of layers, video content encoded therein in units of portions of pictures of the video content using inter-layer prediction, wherein each portion is encoded into a payload packet of a sequence of packets of the video data stream, the sequence of packets being divided into a sequence of access units,
    wherein each access unit includes payload packets associated with a common time instant, and is subdivided into two or more decoding units, with each decoding unit including at least one payload packet associated with one of the plurality of layers, and
    wherein each access unit further includes:
        first timing control information signaling a first decoder buffer retrieval time for retrieving the respective access unit, and
        second timing control information signaling, for each decoding unit of the respective access unit, either a second decoder buffer retrieval time for retrieving the decoding units in the respective access unit according to a sequential order associated with the decoding units in the video data stream, or a third decoder buffer retrieval time for retrieving the decoding units in the respective access unit according to a layer order associated with the decoding units, wherein according to the layer order, the decoding units are ordered such that a decoding unit associated with a first layer of the plurality of layers precedes a decoding unit associated with a second layer of the plurality of layers that succeeds the first layer in accordance with the layer order.

2. The decoder of claim 1, wherein the decoding units associated with different layers are interleaved in the multi-layered video data stream.

3. The decoder of claim 2, wherein the processor is configured to, in emptying a decoder's buffer in units of access units, remove the access units' decoding units, by de-interleaving, in accordance with the layer order.

4. The decoder of claim 1, wherein a decoder's buffer is composed of one partial buffer for each layer, and the processor is configured to, for each layer, buffer the decoding units including packets associated with the respective layer in the partial buffer for the respective layer.

5. The decoder of claim 1, wherein a decoder's buffer is composed of a plurality of partial buffers, each partial buffer associated with a subset of the layers, and the processor is configured to, for each layer, buffer the decoding units comprising packets associated with a respective layer in the partial buffer for the subset of layers to which the respective belongs.

6. The decoder of claim 5, wherein the processor is configured such that one partial buffer synchronizes with the other partial buffers.

7. The decoder of claim 1, wherein the processor is configured to:
    empty a decoder's buffer for buffering the multi-layered data stream in units of access units based on the first timing control information,
    responsive to the second timing control information signaling the second-decoder buffer retrieval time for each decoding unit, empty a decoder's buffer for buffering the multi-layered data stream in units of the decoding units according to the sequential order based on the second decoder buffer retrieval time, and
    responsive to the second timing control information signaling the third-decoder buffer retrieval time for each decoding unit, empty a decoder's buffer for buffering the multi-layered data stream in units of the decoding units according to the layer order based on the third decoder buffer retrieval time.

8. An encoder comprising a processor configured to encode video content into a multi-layered video data stream that includes video content encoded as a plurality of layers in units of portions of pictures of the video content using inter-layer prediction, wherein each portion is encoded into a payload packet of a sequence of packets of the video data stream, the sequence of packets being divided into a sequence of access units,
    wherein each access unit includes payload packets associated with a common time instant, and is subdivided into two or more decoding units, with each decoding unit including at least one payload packet associated with one of the plurality of layers, and
    wherein each access unit further includes:
        first timing control information signaling a first decoder buffer retrieval time for retrieving the respective access unit, and
        second timing control information signaling, for each decoding unit of the respective access unit, either a second decoder buffer retrieval time for retrieving the decoding units in the respective access unit according to a sequential order associated with the decoding units in the video data stream, or a third decoder buffer retrieval time for retrieving the decoding units in the respective access unit according to a layer order associated with the decoding units, wherein according to the layer order, the decoding units are ordered such that a decoding unit associated with a first layer of the plurality of layers precedes a decoding unit associated with a second layer of the plurality of layers that succeeds the first layer in accordance with the layer order.

9. The encoder of claim 8, wherein the decoding units associated with different layers are interleaved in the multi-layered video data stream.

10. The encoder of claim 9, wherein the processor is configured to, in emptying a decoder's buffer in units of access units, remove the access units' decoding units, by de-interleaving, in accordance with the layer order.

11. The encoder of claim 8, wherein a decoder's buffer is composed of one partial buffer for each layer, and the processor is configured to, for each layer, buffer the decoding units including packets associated with the respective layer in the partial buffer for the respective layer.

12. The encoder of claim 8, wherein a decoder's buffer is composed of a plurality of partial buffers, each partial buffer associated with a subset of the layers, and the processor is configured to, for each layer, buffer the decoding units comprising packets associated with a respective layer in the partial buffer for the subset of layers to which the respective belongs.

13. The encoder of claim 12, wherein the processor is configured such that one partial buffer synchronizes with the other partial buffers.

14. The encoder of claim 8, wherein the processor is configured to:
   empty a decoder's buffer for buffering the multi-layered data stream in units of access units based on the first timing control information,
   responsive to the second timing control information signaling the second-decoder buffer retrieval time for each decoding unit, empty a decoder's buffer for buffering the multi-layered data stream in units of the decoding units according to the sequential order based on the second decoder buffer retrieval time, and
   responsive to the second timing control information signaling the third-decoder buffer retrieval time for each decoding unit, empty a decoder's buffer for buffering the multi-layered data stream in units of the decoding units according to the layer order based on the third decoder buffer retrieval time.

15. A non-transitory computer-readable medium for storing data associated with a video, comprising:
   a data stream stored in the non-transitory computer-readable medium, the data stream comprising video content encoded therein as a plurality of layers, in units of portions of pictures of the video content using inter-layer prediction, wherein each portion is encoded into a payload packet of a sequence of packets of the video data stream, the sequence of packets being divided into a sequence of access units,
   wherein each access unit includes payload packets associated with a common time instant, and is subdivided into two or more decoding units, with each decoding unit including at least one payload packet associated with one of the plurality of layers, and
   wherein each access unit further includes:
      first timing control information signaling a first decoder buffer retrieval time for retrieving the respective access unit, and
      second timing control information signaling, for each decoding unit of the respective access unit, either a second decoder buffer retrieval time for retrieving the decoding units in the respective access unit according to a sequential order associated with the decoding units in the video data stream, or a third decoder buffer retrieval time for retrieving the decoding units in the respective access unit according to a layer order associated with the decoding units, wherein according to the layer order, the decoding units are ordered such that a decoding unit associated with a first layer of the plurality of layers precedes a decoding unit associated with a second layer of the plurality of layers that succeeds the first layer in accordance with the layer order.

16. The non-transitory computer-readable medium of claim 15, wherein the decoding units associated with different layers are interleaved in the multi-layered video data stream.

17. The non-transitory computer-readable medium of claim 15, wherein a decoder's buffer is composed of one partial buffer for each layer, and, for each layer, the decoding units including packets associated with the respective layer are buffered in the partial buffer for the respective layer.

18. The non-transitory computer-readable medium of claim 15, wherein a decoder's buffer is composed of a plurality of partial buffers, each partial buffer associated with a subset of the layers, and for each layer, the decoding units comprising packets associated with a respective layer are buffered in the partial buffer for the subset of layers to which the respective belongs.

19. The non-transitory computer-readable medium of claim 16, wherein, in emptying a decoder's buffer in units of access units, the access units' decoding units are removed, by de-interleaving, in accordance with the layer order.

20. The non-transitory computer-readable medium of claim 15, wherein
   a decoder's buffer is emptied for buffering the multi-layered data stream in units of access units based on the first timing control information,
   responsive to the second timing control information signaling the second decoder buffer retrieval time for each decoding unit, a decoder's buffer is emptied for buffering the multi-layered data stream in units of the decoding units according to the sequential order based on the second decoder buffer retrieval time, and
   responsive to the second timing control information signaling the third-decoder buffer retrieval time for each decoding unit, a decoder's buffer is emptied for buffering the multi-layered data stream in units of the decoding units according to the layer order based on the third decoder buffer retrieval time.

* * * * *